(12) United States Patent
Brady

(10) Patent No.: US 12,006,878 B2
(45) Date of Patent: Jun. 11, 2024

(54) METHODS AND APPARATUS TO OPERATE GAS TURBINES WITH HYDROGEN AS THE COMBUSTING FUEL

(71) Applicant: General Electric Company, Schenectady, NY (US)

(72) Inventor: David Justin Brady, Lynn, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/736,803

(22) Filed: May 4, 2022

(65) Prior Publication Data
US 2023/0358180 A1 Nov. 9, 2023

(51) Int. Cl.
F02C 9/18 (2006.01)
F02C 7/143 (2006.01)
F02K 3/00 (2006.01)

(52) U.S. Cl.
CPC .............. *F02C 9/18* (2013.01); *F02C 7/143* (2013.01); *F02K 3/00* (2013.01); *F05D 2220/323* (2013.01); *F05D 2240/35* (2013.01); *F05D 2260/211* (2013.01)

(58) Field of Classification Search
CPC ........... F05D 2220/323; F05D 2260/20; F05D 2240/36; F05D 2220/72; F02C 3/22; F02C 7/224; F02C 7/18; F02C 6/20; F02C 3/30; B64D 27/24; B64D 27/12
See application file for complete search history.

(56) References Cited

U.S. PATENT DOCUMENTS

| | | | |
|---|---|---|---|
| 3,204,403 A | 4/1965 | Mordell | |
| 4,328,674 A * | 5/1982 | Wenzel | ............... F24D 11/0214 60/648 |
| 5,202,525 A | 4/1993 | Coffinberry | |
| 6,282,883 B1 | 9/2001 | Uematsu et al. | |
| 9,771,867 B2 | 9/2017 | Karam et al. | |
| 10,012,177 B2 | 7/2018 | Bond et al. | |
| 11,536,198 B2 * | 12/2022 | Millhaem | ............... F01D 25/12 |

(Continued)

FOREIGN PATENT DOCUMENTS

| | | |
|---|---|---|
| EP | 3623603 A1 | 3/2020 |
| EP | 3904658 A1 | 11/2021 |

(Continued)

OTHER PUBLICATIONS

European Patent Office, "Extended European Search Report," issued in connection with European Patent Application No. 23150521.5, dated Oct. 5, 2023, 7 pages.

*Primary Examiner* — Todd E Manahan
*Assistant Examiner* — Rodolphe Andre Chabreyrie
(74) *Attorney, Agent, or Firm* — HANLEY, FLIGHT & ZIMMERMAN, LLC

(57) ABSTRACT

Methods and apparatus to operate gas turbines with hydrogen as the combusting fuel are disclosed. An example gas turbine system includes an intercooler disposed between at a fan and at least a portion of a compressor, and at least one conduit to define a flow path to convey fluid, the flow path including a first portion and a second portion, the first portion of the flow path to carry the fluid to or through the intercooler, the second portion of the flow path to carry the fluid at least partially around at least one of a low-pressure turbine or an exhaust section downstream of a combustor.

18 Claims, 11 Drawing Sheets

(56) References Cited

U.S. PATENT DOCUMENTS

| | | | |
|---|---|---|---|
| 11,542,870 B1* | 1/2023 | Rambo | F02C 7/22 |
| 2007/0089423 A1* | 4/2007 | Norman | F02C 7/224 |
| | | | 60/736 |
| 2007/0214807 A1* | 9/2007 | Faka | F17C 13/026 |
| | | | 62/50.2 |
| 2014/0182264 A1 | 7/2014 | Weisgerber | |
| 2015/0344144 A1 | 12/2015 | Kamath | |
| 2019/0128184 A1* | 5/2019 | Kim | F02C 7/141 |
| 2019/0153952 A1* | 5/2019 | Niergarth | F02C 7/14 |
| 2019/0153953 A1 | 5/2019 | Niergarth et al. | |
| 2019/0293024 A1 | 9/2019 | Carter | |
| 2021/0207540 A1 | 7/2021 | Roberge | |
| 2021/0300575 A1 | 9/2021 | Staubach et al. | |
| 2021/0301720 A1* | 9/2021 | Staubach | F02C 1/007 |
| 2021/0340908 A1* | 11/2021 | Boucher | F02C 7/224 |
| 2021/0381429 A1 | 12/2021 | Taylor | |
| 2022/0099299 A1* | 3/2022 | Carrotte | F02C 7/143 |

FOREIGN PATENT DOCUMENTS

| | | | |
|---|---|---|---|
| EP | 3978807 A2 | 4/2022 | |
| WO | 2012045034 A2 | 4/2012 | |
| WO | 2014105325 A1 | 7/2014 | |

* cited by examiner

METHODS AND APPARATUS TO OPERATE GAS TURBINES WITH HYDROGEN AS THE COMBUSTING FUEL

FIELD OF THE DISCLOSURE

This disclosure relates generally to gas turbine engines and, more particularly, to methods and apparatus to operate gas turbines with hydrogen as the combusting fuel.

BACKGROUND

In recent years, gas turbines have utilized mixtures of hydrogen gas and conventional fuels because of the advantages hydrogen gas provides. Specifically, hydrogen is an abundantly available element that has beneficial properties for combustion in gas turbines, such as reduced carbon emissions, lower fuel consumption (pounds per hour (pph)), greater energy production, light weight, and high combustion rate and temperature. During combustion of hydrogen gas, chemical energy and thermal energy are converted into mechanical energy. The mechanical energy produced as a result of the combustion can drive downstream turbine blades and provide propulsion to an aircraft or drive a shaft of a generator that produces electric current.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
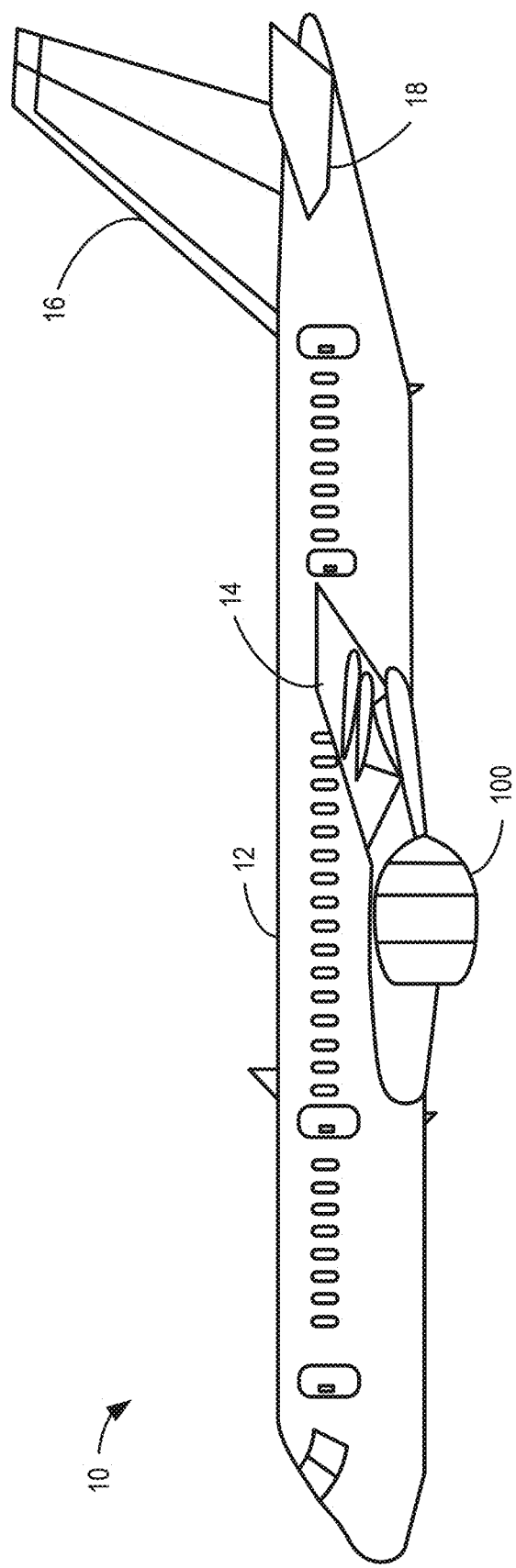
FIG. 1 is a side view of an example aircraft.

As used herein, connection references (e.g., attached, coupled, in connection with, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Hydrogen is an abundant fuel source that has additional beneficial properties for combustion in gas turbines, such as a high combustion rate and temperature, which can increase an efficiency of the gas turbine. Gas turbines produce power and/or mechanical drive for aeronautics, marine applications, gear boxes, off-shore power generators, terrestrial power plants, etc. Gas turbines can utilize hydrogen gas in addition, or in alternative, to other conventional fuels to convert thermal and chemical energy to mechanical energy via combustion. Specifically, a gas turbine that utilizes hydrogen gas as a combusting fuel can incrementally increase a quantity of energy produced compared to a conventional gas turbine that does not utilize hydrogen gas. Further, utilizing hydrogen gas within gas turbines reduces harmful carbon emissions, which is a focus of power producers given the emission regulations that have been implemented by legislation.

However, utilizing hydrogen as fuel presents unique challenges compared to the utilization of conventional hydrocarbons. Specifically, the relatively high combustion temperature and flame propagation speed associated with hydrogen can cause a nozzle that injects the hydrogen to overheat, resulting in deformation. Additionally, the high flame temperature and propagation speed can increase the risk of combustion flashback and/or flame holding occurring in the system. Moreover, combustion flashback and/or flame holding can cause potential deflagration combustion, which presents a catastrophic risk to operators. Accordingly, the risks that result from utilizing hydrogen in combustion have limited the implementation of hydrogen as fuel in gas turbines.

In some known implementations, water is utilized with hydrogen gas to prevent the hydrogen gas from overheating a combustor nozzle(s) upon ignition. For instance, multiple nozzles can be utilized to induce water with hydrogen gas into the combustor. In some instances, a nozzle that induces fuel into the combustor includes a chamber for mixing the fuel with water vapor before the fuel is injected into the combustor. However, water reduces an efficiency of the combustion and, thus, mitigates some of the advantages provided by the utilization of hydrogen.

In some other known implementations, hydrogen is only utilized as a portion of the fuel for combustion and/or only within certain operational limits associated with the gas turbine engine. In some instances, hydrocarbon fuel is supplied to a combustor at all power operations of the gas turbine engine while hydrogen gas is induced at low-power operations and terminated at mid-power and high-power operations. In some examples, hydrogen fuel is utilized in a fuel blend in combination with liquefaction gas, natural gas, and/or coal gas. In some examples, hydrogen fuel accounts for up to 75% of the fuel blend at predetermined power operations. However, limiting the utilization of hydrogen reduces the benefits that hydrogen provides while still encountering the risks of combustion flashback, flame holding, and/or deterioration in the gas turbine engine.

Example methods and apparatus to operate gas turbines with hydrogen as the combusting fuel are disclosed herein. An example gas turbine system disclosed herein includes at least one conduit that defines a flow path to transport hydrogen from a liquid or cryogenic hydrogen supply to a combustor. The utilization of cryogenic hydrogen prevents the hydrogen from overheating during an operation of the gas turbine engine. Accordingly, certain risks associated with the utilization of hydrogen as a combusting fuel are reduced. For example, the risk of overheating a combustor nozzle(s) is reduced as the temperature of the hydrogen can be kept near the minimum combustion temperature required for hydrogen in advance of ignition. Moreover, storing the hydrogen in a liquid or cryogenic state can reduce a size of a hydrogen storage supply.

To increase a temperature of the liquid or cryogenic hydrogen in preparation for combustion, the conduit(s) can carry the hydrogen from a liquid or cryogenic supply to an intercooler disposed between (a) a fan and a compressor or (b) consecutive stages of the compressor. In turn, the intercooler can enable a thermal energy transfer to occur between air flowing through the fan and/or the compressor and hydrogen flowing through the intercooler. As a result, a temperature of the hydrogen increases such that the hydrogen progresses from the liquid or cryogenic state towards a gaseous state or super-critical phase suitable for combustion. Additionally, a temperature of the air is reduced, which increases a density of the air and, in turn, an efficiency of the air compression. Accordingly, the compressor can be installed with weight and/or cost saving simplifications, such as reduced stages and/or a lower tip speed. In turn, the compressor can produce an increased pressure ratio while inputting a reduced amount of work. Furthermore, the conduit(s) can carry the hydrogen at least partially through and/or around a turbine section and/or an exhaust section downstream of the combustor to increase the temperature of the hydrogen such that the hydrogen reaches a combustible temperature range. Accordingly, the hydrogen can then be metered and injected into the combustor.

In certain examples, an intermediate fluid (e.g., a heat exchange fluid such as a supercritical fluid (e.g., supercritical carbon dioxide ($sCO_2$), etc.), etc.) flows through the conduit(s) (e.g., at least one first conduit). That is, the heat exchange fluid flows through the intercooler as well as at least partially through and/or around the turbine section and/or the exhaust section. Furthermore, the heat exchange fluid can transfer the collected heat to the hydrogen. For example, the hydrogen can flow through at least one second conduit, and a vaporizer in connection with the first conduit(s) and the second conduit(s) can cause thermal energy to be transferred between the heat exchange fluid and the hydrogen. After being cooled by the hydrogen, the heat exchange fluid can recirculate through the first conduit(s). That is, the heat exchange fluid can re-enter the intercooler and again absorb heat from air entering or flowing through the compressor as well as exhaust air driving the turbines downstream of the combustor and/or being dispelled from the gas turbine. Accordingly, the first conduit(s) can form a closed loop that receives heat in more than one location and transfers the received heat to the hydrogen.

In certain examples, additional heat exchangers are in connection with the first conduit(s). For example, the first conduit(s) can be in connection with a cooled cooling air (CCA) heat exchanger. Specifically, the CCA heat exchanger can receive the heat exchange fluid as well as bleed air from the compressor. In turn, the CCA heat exchanger can cause the bleed air to transfer thermal energy to the heat exchange fluid such that the bleed air is cooled and the heat exchange fluid is heated. In turn, the CCA heat exchanger can enable the cooled bleed air to return to the compressor at a reduced temperature and/or a higher density. As a result, an oxygen concentration in the air increases, which enables an increased portion of the air to partake in a combustion reaction with hydrogen. Moreover, the reduced temperature of the air can reduce a flame temperature within the combustor and, thus, help prevent damage to combustor nozzles.

In certain examples, the first conduit is in connection with an environmental control system (ECS) heat exchanger such that the heat exchange fluid can be warmed by air to be provided to a fuselage and the air can conversely be cooled and compressed. In turn, the gas turbine system can remove or reduce a need for other resources to provide cooled, pressurized air to a cabin of the aircraft.

In certain examples, the first conduit is in connection with a lubricant heat exchanger (e.g., an oil cooler). Specifically, the lubricant heat exchanger can enable a thermal energy transfer between the heat exchange fluid and a lubricant associated with an actuation system to maintain the lubricant within a certain temperature range that prevents a viscosity of the lubricant from being adversely affected by repeated usage.

In general, the order according to which the first conduit(s) carries the heat exchange fluid to or through the respective heat exchangers can vary and may depend on the individual gas turbine system. For example, the ECS heat exchanger and/or the CCA heat exchanger can be in connection with the first conduit(s) upstream or downstream of the intercooler. Accordingly, the amount of heat that the heat exchange fluid and, in turn, the hydrogen receives can be controlled while also controlling the amount of heat absorbed from other fluids, such as air flowing through the gas turbine or into the fuselage and/or oil that is to serve as a lubricant.

Additionally, at least one fluid pump can be in connection with the first conduit(s). In turn, an output of the fluid pump(s) can control a mass flow of the heat exchange fluid. As such, processor circuitry can control the output of the fluid pump(s) to control the amount of heat being sent into the vaporizer and, in turn, control the temperature increase of the hydrogen. Additionally or alternatively, one or more bypass valves can be positioned in the first conduit(s) and, thus, the processor circuitry can control a position(s) of the bypass valve(s) to modify the amount of thermal energy that the heat exchange fluid collects during a cycle. Furthermore, the heat exchange fluid can be inert to combustion such that any leakage in the first conduit(s) does not result in an unwanted ignition.

Referring now to the drawings, FIG. 1 is a side view of an example aircraft 10. The aircraft 10 includes a fuselage 12 and a pair of wings 14 (one is shown) extending outward from the fuselage 12. In the illustrated example, a gas turbine 100 is supported on each wing 14 to propel the aircraft through the air during flight. Additionally, as shown, the aircraft 10 includes a vertical stabilizer 16 and a pair of horizontal stabilizers 18 (one is shown). However, in some other examples, the aircraft 10 may include any other suitable configuration, such as any other suitable number of gas turbine engines.

The configuration of the aircraft 10 described above and shown in FIG. 1 is provided only to place the present subject matter in an exemplary field of use. Thus, the present subject matter may be readily adaptable to any manner of aircraft and/or any other system having a gas turbine that utilizes hydrogen to produce mechanical energy, such as a gas turbine generator.

Figure 2:
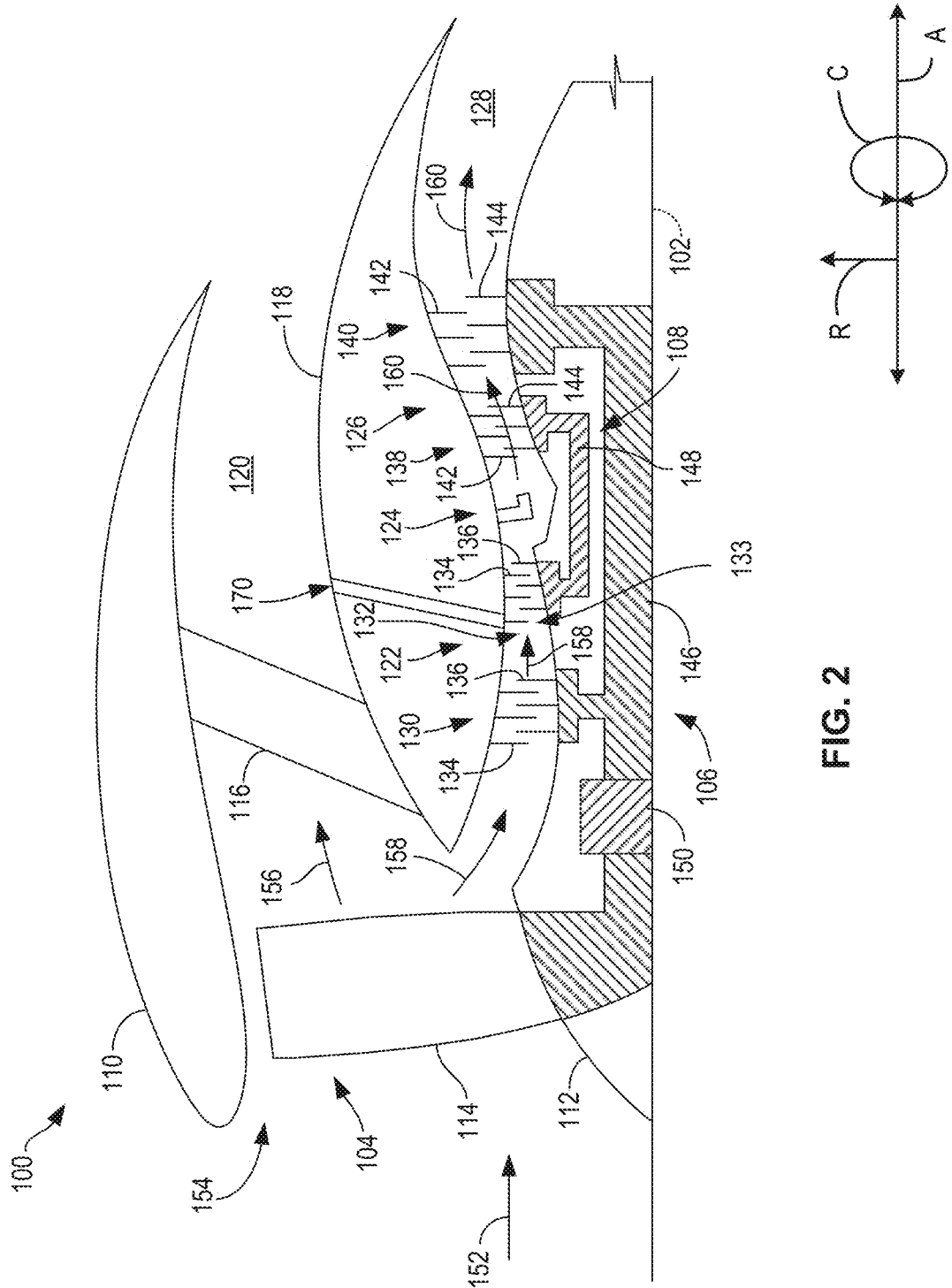
FIG. 2 is a schematic cross-sectional view of an example gas turbine engine of the example aircraft of FIG. 1.

FIG. 2 is a schematic cross-sectional view of the gas turbine 100 of FIG. 1. In the illustrated example, the gas turbine 100 is configured as a high-bypass turbofan engine. However, in alternative examples, the gas turbine 100 may be configured as a propfan engine, a turbojet engine, a turboprop engine, a turboshaft gas turbine engine, or any other suitable type of gas turbine engine.

In general, the gas turbine 100 extends along an axial centerline 102 and includes a fan 104, a low-pressure (LP) shaft 106, and a high pressure (HP) shaft 108 at least partially encased by an annular nacelle 110. More specifically, the fan 104 may include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP shaft s 106, 108 are positioned downstream from the fan 104 along the axial centerline 102. As shown, the LP shaft 106 is rotatably coupled to the fan rotor 112, thereby permitting the LP shaft 106 to rotate the fan blades 114. Additionally, a plurality of outlet guide vanes or struts 116 circumferentially spaced apart from each other and extend radially between an outer casing 118 surrounding the LP and HP shaft s 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustor section 124, a turbine section 126, and an exhaust section 128. In some examples, the compressor section 122 may include a low-pressure (LP) compressor 130 of the LP shaft 106 and a high-pressure (HP) compressor 132 of the HP shaft 108 positioned downstream from the LP compressor 130 along the axial centerline 102. Each compressor 130, 132 may, in turn, include one or more rows of stator vanes 134 interdigitated with one or more rows of compressor rotor blades 136. As such, the compressors 130, 132 define a compressed air flow path 133 extending therethrough. Moreover, in some examples, the turbine section 126 includes a high-pressure (HP) turbine 138 of the HP shaft 108 and a low-pressure (LP) turbine 140 of the LP shaft 106 positioned downstream from the HP turbine 138 along the axial centerline 102. Each turbine 138, 140 may, in turn, include one or more rows of stator vanes 142 interdigitated with one or more rows of turbine rotor blades 144.

Additionally, the LP shaft 106 includes the low-pressure (LP) shaft 146 and the HP shaft 108 includes a high pressure (HP) shaft 148 positioned concentrically around the LP shaft 146. In such examples, the HP shaft 148 rotatably couples the turbine rotor blades 144 of the HP turbine 138 and the compressor rotor blades 136 of the HP compressor 132 such that rotation of the turbine rotor blades 144 of the HP turbine 138 rotatably drives the compressor rotor blades 136 of the HP compressor 132. As shown, the LP shaft 146 is directly coupled to the turbine rotor blades 144 of the LP turbine 140 and the compressor rotor blades 136 of the LP compressor 130. Furthermore, the LP shaft 146 is coupled to the fan 104 via a gearbox 150. In this respect, the rotation of the turbine rotor blades 144 of the LP turbine 140 rotatably drives the compressor rotor blades 136 of the LP compressor 130 and the fan blades 114.

The gas turbine 100 can generate thrust to propel the aircraft 10 of FIG. 1. More specifically, during operation, air (indicated by arrow 152) enters an inlet portion 154 of the gas turbine 100. The fan 104 supplies a first portion (indicated by arrow 156) of the air 152 to the bypass airflow passage 120 and a second portion (indicated by arrow 158) of the air 152 to the compressor section 122. The second portion 158 of the air 152 first flows through the LP compressor 130 in which the compressor rotor blades 136 therein progressively compress the second portion 158 of the air 152. Next, the second portion 158 of the air 152 flows through the HP compressor 132 in which the compressor rotor blades 136 therein continue to progressively compress the second portion 158 of the air 152. The compressed second portion 158 of the air 152 is subsequently delivered to the combustor section 124. In the combustor section 124, the second portion 158 of the air 152 mixes with hydrogen and burns to generate high-temperature and high-pressure combustion gases 160. The hydrogen can be warmed upstream of (e.g., in advance of entering) the combustor section 124 such that the hydrogen combusts in the combustor section 124 in response to mixing with the air 152 and being ignited, as discussed in further detail below. Thereafter, the combustion gases 160 flow through the HP turbine 138 where the turbine rotor blades 144 of the HP turbine 138 extract a first portion of kinetic and/or thermal energy from the combustion gases 160. This energy extraction rotates the HP shaft 148, thereby driving the HP compressor 132. The combustion gases 160 then flow through the LP turbine 140 where the turbine rotor blades 144 of the LP turbine 140 extract a second portion of kinetic and/or thermal energy from the combustion gases 160. This energy extraction rotates the LP shaft 146, thereby driving the LP compressor 130 and the fan 104 via the gearbox 150. The combustion gases 160 then exit the gas turbine 100 through the exhaust section 128.

Furthermore, in some examples, the gas turbine 100 defines a third-stream flow path 170. In general, the third-stream flow path 170 extends from the compressed air flow path 170 defined by the compressor section 122 to the bypass airflow passage 120. In this respect, the third-stream flow path 170 allows a portion of the compressed air 158 from the compressor section 122 to bypass the combustor section 124. More specifically, in some examples, the third-stream flow path 170 may define a concentric or non-concentric passage relative to the compressed air flow path 170 downstream of one or more of the compressors 130, 132 or the fan 104. The third-stream flow path 170 may be configured to selectively remove a portion of compressed air 158 from the compressed air flow path 170 via one or more variable guide vanes, nozzles, or other actuable flow control structures.

The configuration of the gas turbine 100 described above and shown in FIG. 2 is provided only to place the present subject matter in an exemplary field of use. Thus, the present subject matter may be readily adaptable to any manner of gas turbine configuration, including other types of aviation-based gas turbine engines, marine-based gas turbine engines, land-based/industrial gas turbine engines, and/or gas turbine generators.

Figure 3:
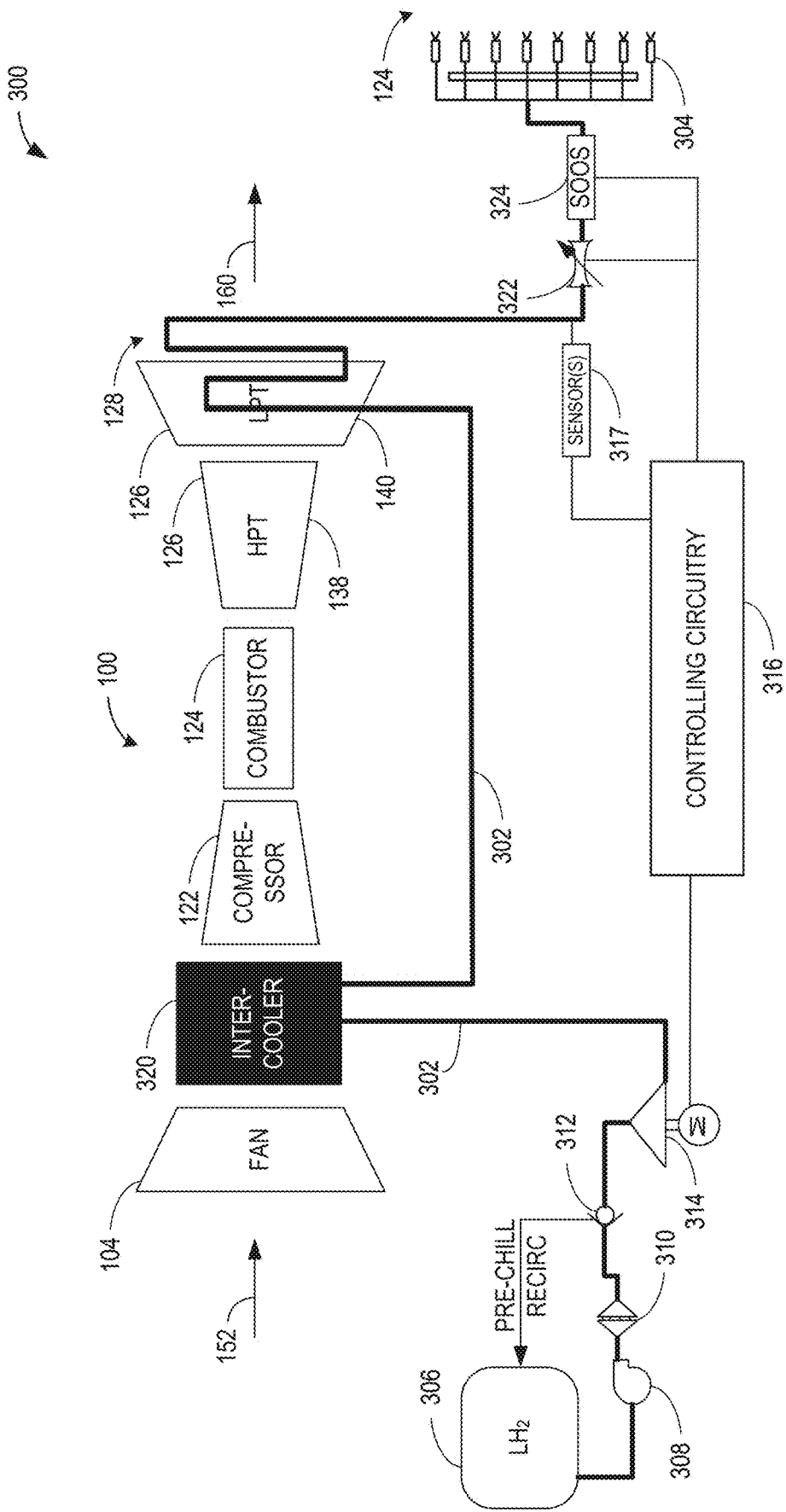
FIG. 3 is a schematic representation of a first example gas turbine system.

FIG. 3 is a schematic representation of a first example gas turbine system 300 in accordance with the teachings disclosed herein. In the illustrated example, the gas turbine system 300 includes the gas turbine 100. As shown, the fan 104, the compressor section 122, the combustor section 124, the turbine section 126, and the exhaust section 128 of the gas turbine 100 are simplified for exemplary purposes.

In the illustrated example of FIG. 3, the gas turbine system 300 includes at least one conduit 302 (e.g., at least one pipe, at least one duct, etc.) that defines a fuel flow path. In particular, hydrogen flows through the fuel flow path defined by the conduit(s) 302 in advance of being injected into the combustor section 124 by one or more nozzles 304. In turn, the hydrogen can combust in the combustor section 124 to provide mechanical energy that can drive the HP shaft 108 and the LP shaft 106 of the gas turbine 100 and propel the aircraft 10.

In the illustrated example of FIG. 3, the gas turbine system 300 includes a hydrogen storage tank 306 (e.g., a hydrogen supply) that stores the hydrogen in a liquid or cryogenic state. The conduit(s) 302 can be fluidly coupled to the hydrogen storage tank 306. In some examples, the hydrogen storage tank 306 is positioned in the fuselage 12. As such, the conduit(s) 302 can extend from the fuselage 12 to the nozzles 304 fluidly coupled to the combustor section 124. As discussed in further detail below, the conduit(s) 302 can extend through a pump(s), a condenser(s), and/or a valve(s) in addition to components described below as fluidly coupled to or in connection with the conduit(s) 302.

Advantageously, storing the hydrogen in the liquid or cryogenic state enables more hydrogen to be stored in a smaller space and, in turn, enables a weight of the hydrogen storage tank 306 to be reduced compared to if the hydrogen were stored in a gaseous form. In fact, a gaseous hydrogen storage may not be able to store enough hydrogen to fuel longer flights as the gaseous hydrogen has a reduced density compared to liquid or cryogenic hydrogen and, thus, may require more storage space than there is available in the aircraft 100.

In the illustrated example of FIG. 3, the gas turbine system 300 includes a cryo-pump 308, a filter 310, a first valve 312, and a hydrogen pump 314 (e.g., a liquid hydrogen pump, a centrifugal pump, a positive displacement pump, etc.). In FIG. 3, the cryo-pump 308 traps hydrogen that escapes from the hydrogen storage tank 306 in a gaseous form and condenses the hydrogen gas on a cold surface such that the hydrogen gas returns to the liquid or cryogenic state. In turn, the cryo-pump 308 pumps the cryogenic hydrogen towards the filter 310, which traps solid particles and enables liquid or gas to flow past. In some examples, the gas turbine system 300 includes more than one of the filter 310 in connection with the conduit(s) 302. Further, the cryogenic hydrogen flows towards the first valve 312. When the first valve 312 is closed, the cryogenic hydrogen loops back to the hydrogen storage tank 306. When the first valve 312 is open, the cryogenic hydrogen flows towards the hydrogen pump 314. In turn, the hydrogen pump 314 pumps the cryogenic hydrogen through the conduit(s) 302.

In the illustrated example of FIG. 3, the gas turbine system 300 includes controlling circuitry 316 communicatively coupled to a motor of the hydrogen pump 314. As such, the controlling circuitry 316 can control a flow rate output of the hydrogen pump 314 by controlling an input signal provided to the motor. Specifically, the motor can drive a rotation of expeller blades that propel the hydrogen through the conduit(s) 302. By controlling the flow rate output of the hydrogen pump 314, the controlling circuitry 316 can control an amount of thermal energy that the hydrogen receives while traveling through the conduit(s) 302 and/or a rate at which the hydrogen receives the thermal energy, as discussed in further detail below.

In the illustrated example of FIG. 3, the gas turbine system 300 includes sensor(s) 317 (e.g., a pressure sensor(s), a temperature sensor(s), a flow rate sensor(s), etc.) in connection with the conduit(s) 302. The sensor(s) 317 can be in connection with the conduit(s) 302 at any location along the fuel flow path. In some examples, the sensor(s) 317 are distributed throughout the fuel flow path and are in connection with the conduit(s) 302 at various points. In FIG. 3, the controlling circuitry 316 can control the flow rate output of the hydrogen pump 314 to enable a burn flow rate of the hydrogen in the combustor section 124 to satisfy (e.g., be greater than or equal to) a burn flow rate threshold.

To increase a temperature of the hydrogen such that the hydrogen is able to convert from a liquid to a gaseous or super-critical phase that enables the hydrogen to combust in the combustor section 124, the conduit(s) 302 carry the hydrogen through an intercooler 320 between the fan 104 and the compressor section 122 of the gas turbine 100. The intercooler 320 enables a thermal energy transfer to occur between the hydrogen and the air 152 entering the compressor section 122. In some other examples, the intercooler 320 is positioned between stages of the compressor section 122. For example, the intercooler 320 can be positioned between a first stage of blades (e.g., the rotor blades 136 of FIG. 2) and a second stage of blades (e.g., the stator vanes 134 of FIG. 2).

In FIG. 3, the fan 104 can push the air 152 between fins of the intercooler 320 towards the compressor section 122.

Further, the intercooler 320 includes and/or is in connection with the conduit(s) 302 (e.g., the intercooler 320 is fluidly coupled to the conduit(s) 302) such that the intercooler 320 contains the hydrogen. For example, the conduit(s) 302 can form, or be in connection with, a grid or network that causes the hydrogen to flow throughout the intercooler 320 while a surface of the intercooler 320 separates the air 152 from the hydrogen. Specifically, the intercooler 320 can be implemented by a bar and plate type intercooler, a tube and fin type intercooler, and/or any other type of intercooler that can carry the hydrogen while allowing the air 152 to pass through to the compressor section 122.

As a result, the hydrogen is warmed by the air 152 flowing through the intercooler 320 while the air 152 is simultaneously cooled by the hydrogen. Accordingly, the intercooler 320 can cause the liquid hydrogen to transition towards a combustible temperature (e.g., at least −250° C.). Furthermore, by cooling the air 152, the intercooler 320 increases a density of the air 152, which results in an overall pressure ratio increase when the air 152 moves into the combustor. Additionally, by cooling the air 152, the intercooler 320 can reduce a volume that oxygen occupies per unit of mass. As such, the intercooler 320 can increase an oxygen concentration in the air 152 and, thus, enables a greater concentration of the air 152 to be part of a combustion reaction, which can increase mechanical energy produced by the combustion reaction. Moreover, the reduced temperature of the air 152 can prevent the air 152 from autoigniting and, in turn, allow the air 152 to travel further into the combustor section 124 prior to combustion. As such, the intercooler 320 can help provide an increased separation between the combustion and the nozzle(s) 304 to reduce temperatures encountered by the nozzle(s) 304.

In the illustrated example of FIG. 3, after the hydrogen exits the intercooler 320, the conduit(s) 302 carry the hydrogen at least partially through and/or around the turbine section 126 and/or the exhaust section 128 of the gas turbine 100 (e.g., an aft portion of the gas turbine 100). Specifically, the conduit(s) 302 can be positioned in the outer casing 118 (FIG. 2) of the gas turbine 100 around a portion of the gas turbine 100 downstream of the combustor section 124 such that the hydrogen can receive thermal energy from the combustion gases 160. As such, a portion of the conduit(s) 302 can form a vaporizer (e.g., a waste heat recovery vaporizer) that enables the thermal energy from the combustion gases 160 to convert the hydrogen to a gaseous or super-critical phase in preparation for combustion. For example, the conduit(s) 302 can form loops that are positioned at least partially around a perimeter of the low-pressure turbine 140 and/or the exhaust section 128. In some other examples, the conduit(s) 302 may form any other geometry to enable the hydrogen to receive a certain amount of thermal energy from the combustion gases 160 (FIG. 2). For example, the conduit(s) 302 may form a spiral and/or wrap concentrically around the turbine section 126 and/or the exhaust section 128. In turn, a pressure and/or a temperature of the hydrogen can become greater than, or equivalent to, a pressure and/or a temperature defined by the critical point of hydrogen (e.g., 33.2 Kelvin (K) and 12.8 atmospheric pressure (atm)) such that the intercooler 320 causes the hydrogen to be in the super-critical phase or in gaseous phase.

In some examples, to heat the hydrogen in the conduit(s) 302 during start-up operations, the gas turbine system 300 includes at least one trim vaporizer operatively coupled to the conduit(s) 302. Accordingly, the trim vaporizer(s) can enable the hydrogen to receive enough heat for an initial combustion when the combustion gases 160 have not yet been produced. In such examples, the trim vaporizer(s) can be deactivated in response to the hydrogen in the conduit(s) 302 satisfying a temperature threshold and/or in response to a power output of the gas turbine 100 satisfying a power output threshold associated with the intercooler 320 and the vaporizer providing enough heat to cause the hydrogen to transition to a combustible temperature. For example, the controlling circuitry 316 can control a power setting of the trim vaporizer(s) based on the temperature measured by the sensor(s) 317 and/or the power output of the gas turbine 100.

In some examples, to enable the hydrogen to receive thermal energy between the intercooler and the aft portion of the gas turbine 100, the conduit(s) 302 carry the hydrogen through the outer casing 118 (FIG. 2) and, in turn, the hydrogen can receive thermal energy from other sections of the gas turbine 100. For example, the conduit(s) 302 can carry the hydrogen in the outer casing 118 (FIG. 2) proximate the compressor section 122 the combustor section 124, and/or the HP turbine section 138. In such examples, to prevent the hydrogen from receiving too much heat from the combustor section 124, the conduit(s) 302 may be positioned further from the combustor section 124 than other sections of the gas turbine 100. In that respect, the conduit(s) 302 may run along an outer radial surface of the outer casing 118 to increase a separation between the hydrogen and the combustor section 124. In turn, the hydrogen can receive thermal energy from the air 152 flowing through the bypass airflow passage 120 (FIG. 2) between the outer casing 118 and the nacelle 110 (FIG. 2). In some other examples, the conduit(s) 302 exit the outer casing 118 downstream of the intercooler 320. For example, the conduit(s) 302 can carry the hydrogen in another part of the aircraft 10 (FIG. 1), such as the nacelle 110 (FIG. 2), the wing 14 (FIG. 1), and/or the fuselage 12 (FIG. 1). It should be understood that the conduit(s) 302 are not fluidly coupled with the combustor section 124, the turbine section 126, or the exhaust section 128 to prevent the hydrogen from mixing with the combustion gases 160 in advance of being injected into the combustor section 124 via the nozzles 304.

In the illustrated example of FIG. 3, after the hydrogen receives thermal energy from the combustion gases 160 flowing through the aft portion of the gas turbine 100, the conduit(s) 302 transport the hydrogen to at least one fuel metering valve 322. In FIG. 3, the controlling circuitry 316 is communicatively coupled to the fuel metering valve(s) 322. Specifically, the controlling circuitry 316 controls a position of the fuel metering valve(s) 322 to control an amount of the hydrogen being provided to the nozzle(s) 304 and, thus, control a ratio of hydrogen to air in the combustor section 124. In addition, the controlling circuitry 316 can be communicatively coupled with a safety valve 324. For example, the controlling circuitry 316 can adjust a position of the safety valve 324 to release the hydrogen from the conduit(s) 302 in response to a pressure within the conduit(s) 302 exceeding a pressure threshold (e.g., 2 times greater than a maximum normal working pressure encountered during high-power conditions, 1.5 times greater than a maximum normal working pressure encountered during high-power conditions, etc.).

Although the gas turbine system 300 of the illustrated example of FIG. 3 includes certain components, it should be understood that the gas turbine system 300 may include other components in addition to those shown in FIG. 3. For example, the gas turbine system 300 can include additional valves and/or filters in connection with the conduit(s) 302.

Additionally or alternatively, the gas turbine system 300 can include trim vaporizers, as discussed above.

Figure 4:
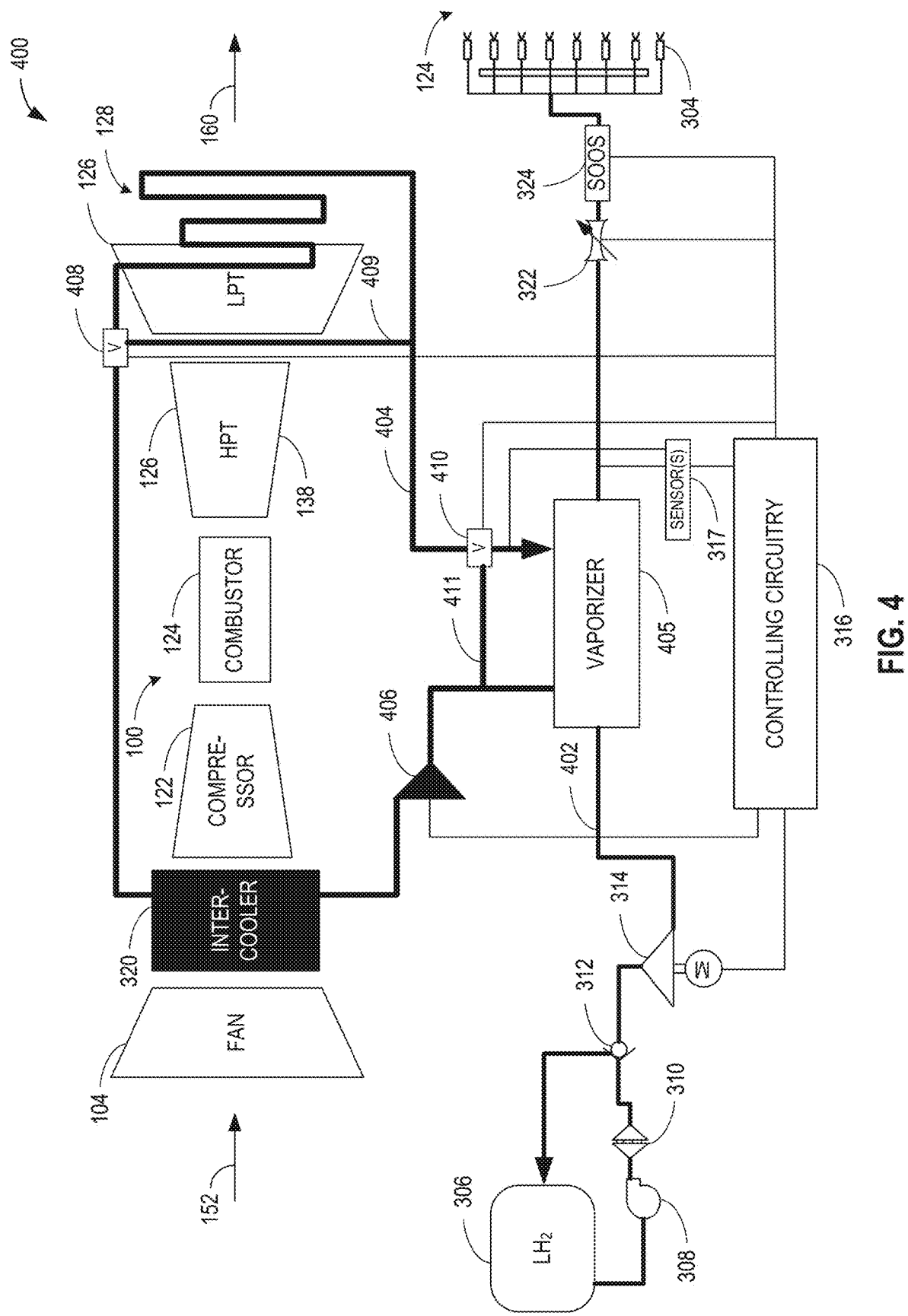
FIG. 4 is a schematic representation of a second example gas turbine system.

FIG. 4 is a schematic representation of a second example gas turbine system 400 in accordance with the teachings disclosed herein. In the illustrated example, the second gas turbine system 400 includes the gas turbine 100. As shown, the fan 104, the compressor section 122, the combustor section 124, the turbine section 126, and the exhaust section 128 of the gas turbine 100 are simplified for exemplary purposes.

In the illustrated example of FIG. 4, the second gas turbine system 400 includes at least one first conduit 402 (e.g., at least one pipe, at least one duct, etc.) to transport hydrogen and at least one second conduit 404 (e.g., at least one pipe, at least one duct, etc.) to transport an intermediate fluid (e.g., a heat exchange fluid such as a supercritical fluid (e.g., supercritical carbon dioxide ($sCO_2$), etc.), etc.).

The second gas turbine system 400 includes a vaporizer 405 in connection with the first conduit(s) 402 and the second conduit(s) 404. The vaporizer 405 causes the hydrogen in the first conduit(s) 402 to exchange thermal energy with the heat exchange fluid in the second conduit(s) 404. As a result, the heat exchange fluid heats the hydrogen while the hydrogen cools the heat exchange fluid. In that respect, the vaporizer 405 can cause the hydrogen to transition to a temperature at which the hydrogen can combust in response to ignition. In other words, the hydrogen can enter the vaporizer 405 in a liquid state and exit the vaporizer 405 in a gaseous state or a super-critical phase. In FIG. 4, the vaporizer 405 may include a shell and tube heat exchanger(s), a double pipe heat exchanger(s), a plate-fin heat exchanger(s), a pin-fin heat exchanger(s), an additive heat exchanger(s), or any other type of heat exchanger. Further, the vaporizer 405 may be formed of metal, graphite, ceramic, or any other material with a high thermal conductivity and melting point. After the hydrogen passes through the vaporizer 405, the first conduit(s) 402 can carry the hydrogen to the fuel metering valve(s) 322, which controls a rate at which the hydrogen is injected into the combustor section 124 by the nozzle(s) 304.

In the second gas turbine system 400, the heat exchange fluid in the second conduit(s) 404 collects thermal energy similar to the hydrogen in the first gas turbine system 300 of FIG. 3. The heat exchange fluid is driven through the second conduit(s) 404 by a heat exchange fluid pump 406, as discussed further in association with FIG. 5. Specifically, the controlling circuitry 316 controls an output of the heat exchange fluid pump 406 to control the amount of the thermal energy that the heat exchange fluid collects and/or the rate at which the heat exchange fluid collects the thermal energy.

For example, the controlling circuitry 316 can control the flow rate output of the heat exchange fluid pump 406 based on the temperature, the pressure, and/or the flow rate of the hydrogen in the first conduit(s) 402 and/or the heat exchange fluid in the second conduit(s) as measured by the sensor(s) 317. For example, the controlling circuitry 316 can cause the flow rate output of the heat exchange fluid pump 406 to be reduced in response to the temperature of the hydrogen and/or the heat exchange fluid not satisfying (e.g., being less than) a first temperature threshold (e.g., 75° F., 100° F., 150° F., etc.), in response to the pressure of the hydrogen and/or the heat exchange fluid not satisfying (e.g., being less than) a first pressure threshold (e.g., a pressure that avoids a 2-phase (e.g., liquid-gaseous) mixture of the hydrogen, a pressure at least 1.5 times greater than a static pressure in the combustor, etc.), and/or in response to the flow rate of the hydrogen and/or the heat exchange fluid satisfying (e.g., being greater than) a first flow rate threshold (e.g., 3,100 pounds per hour (pph), 900 pph, etc.). Accordingly, the controlling circuitry 316 can cause the heat exchange fluid pump 406 to drive the heat exchange fluid through the second conduit(s) 404 at a reduced rate to increase the heat collected by the heat exchange fluid from the air 152 and/or the combustion gases 160 flowing through the gas turbine 100. Further, by causing the heat exchange fluid to flow through the second conduit(s) 404 at the reduced rate, the controlling circuitry 316 can enable the heat exchange fluid to transfer more heat to the hydrogen in the vaporizer 405. Similarly, to prevent the hydrogen from overheating and/or to prevent a pressure in the first conduit(s) 402 from exceeding a pressure that the first conduit(s) 402 can withstand, the controlling circuitry 316 can cause the flow rate output of the heat exchange fluid pump 406 to be increased in response to the temperature of the hydrogen and/or the heat exchange fluid satisfying (e.g., being greater than) a second temperature threshold (e.g., 250° C., 350° C., 450° C., etc.), in response to the pressure of the hydrogen and/or the heat exchange fluid satisfying (e.g., being greater than) a second pressure threshold (e.g., 2 times greater than a maximum normal working pressure encountered during high-power conditions, 1.5 times greater than a maximum normal working pressure encountered during high-power conditions, etc.), and/or in response to the flow rate of the hydrogen and/or the heat exchange fluid satisfying (e.g., being less than) a second flow rate threshold (e.g., 30 pph, 20 pph, etc.). Although certain temperature, pressure, and flow rate thresholds are provided herein, such thresholds may be adjusted based on the specific application of the second gas turbine system 400. Thus, the example threshold values are not all encompassing and do not define all operational ranges of the gas turbine system 400. Although the sensor(s) 317 are depicted as in connection with the first conduit(s) 402 and the second conduit(s) 404 in certain locations, it should be understood the sensor(s) 317 can obtain measurements at any location along the first conduit(s) 402 and the second conduit(s) 404 and may be located at various points throughout the first conduit(s) 402 and the second conduit(s) 404.

In the illustrated example of FIG. 4, the second conduit(s) 404 is in connection with the intercooler 320. Accordingly, the heat exchange fluid can flow within the intercooler 320 and exchange thermal energy with the air 152 driven through the intercooler 320 by the fan 104. Further, the second conduit(s) 404 carries the heat exchange fluid toward the aft portion of the gas turbine 100. In some examples, at least a portion of the second conduit(s) 404 is positioned in, or proximate to, the outer casing 118 (FIG. 2). As such, the second conduit(s) 404 can enable the heat exchange fluid to receive thermal energy from the air 152 traveling through the compressor section 122, from the combustion gases 160 traveling through the combustor section 124 and/or the high pressure turbine 138, and/or from the air 152 in the bypass airflow passage 120 as the second conduit(s) 404 transport the heat exchange fluid towards the aft portion of the gas turbine 100.

In the illustrated example of FIG. 4, the second gas turbine system 400 includes a first bypass valve 408 in connection with the second conduit(s) 404. When the first bypass valve 408 is in a first position (e.g., a closed position), the second conduit(s) 404 carries the heat exchange fluid at least partially around and/or through the turbine section 126 and/or the exhaust section 128 of the gas turbine 100. In turn, the heat exchange fluid can receive thermal energy from the combustion gases 160 traveling through the turbine section 126 and/or the exhaust section 128.

When the first bypass valve 408 is in a second position (e.g., an open position), the first bypass valve 408 causes at least a portion of the heat exchange fluid to enter a first bypass conduit 409 and bypass a portion of the second conduit(s) 404. Specifically, the first bypass conduit 409 exposes the heat exchange fluid to less thermal energy from the turbine section 126 and/or the exhaust section 128. As such, the first bypass valve 408 can cause heat exchange fluid to receive less thermal energy from the combustion gases 160. In some examples, the first bypass conduit 409 still enables the heat exchange fluid to receive thermal energy from the combustion gases 160 but over a reduced length compared to when the second conduit(s) 404 continue to carry the heat exchange fluid (e.g., when the first bypass valve 408 is in the first position).

In FIG. 4, the controlling circuitry 316 controls a position of the first bypass valve 408. Specifically, the second gas turbine system 400 can include the sensor(s) 317 in connection with the first conduit(s) 402 such that the sensor(s) 317 can measure a temperature and/or a pressure of the hydrogen in the first conduit(s) 402. The controlling circuitry 316 can then compare the temperature of the hydrogen to a first temperature threshold and/or compare the pressure of the hydrogen to a first pressure threshold. In response to the temperature of the hydrogen satisfying (e.g., being greater than) the first temperature threshold or the pressure of the hydrogen satisfying (e.g., being greater than) the first pressure threshold, the controlling circuitry 316 can adjust the first bypass valve 408 to the second position to reduce the amount of heat the heat exchange fluid receives from the combustion gases 160.

In the illustrated example of FIG. 4, the second gas turbine system includes a second bypass valve 410 in connection with the second conduit(s) 404. When the second bypass valve 410 is in a first position (e.g., a closed position), the second conduit(s) carries the heat exchange fluid to and/or through the vaporizer 405. As a result, the heat exchange fluid can transfer heat to the hydrogen flowing through the vaporizer 405.

When the second bypass valve 410 is in a second position (e.g., an open position) the second bypass valve 410 causes a portion of the heat exchange fluid to flow through a second bypass conduit 411. Specifically, the second bypass conduit 411 enables the portion of the heat exchange fluid to bypass the vaporizer 405. As such, with the heat exchange fluid being induced into the vaporizer 405 at a reduced rate, the heat exchange fluid remains in the vaporizer 405 for a longer period. Accordingly, the heat exchange fluid exchanges thermal energy with the hydrogen for an increased duration. Accordingly, as the heat exchange fluid remains in the vaporizer 405, the heat exchange fluid continues to lose thermal energy to the hydrogen and, thus, a portion of the hydrogen entering the vaporizer 405 may receive thermal energy from relatively cooler heat exchange fluid compared to if the heat exchange fluid were induced into the vaporizer 405 at a faster rate.

In the illustrated example of FIG. 4, the controlling circuitry 316 controls a position of the second bypass valve 410 similar to the first bypass valve 408. For example, in response to the temperature of the hydrogen satisfying (e.g., being greater than) a second temperature threshold or the pressure of the hydrogen satisfying (e.g., being greater than) a second pressure threshold, the controlling circuitry 316 can cause the second bypass valve 410 to move from the first position to the second position to reduce the amount of thermal energy that the hydrogen receives from the heat exchange fluid.

In some examples, the controlling circuitry 316 can adjust the second bypass valve 410 to more than two positions. For example, the controlling circuitry 316 can adjust the second bypass valve 410 to a third position (e.g., a partially open position) to enable the hydrogen to receive more thermal energy than when the second bypass valve 410 is in the second position but less thermal energy than when the second bypass valve 410 is in the first position. Accordingly, the controlling circuitry 316 may adjust the second bypass valve 410 the third position in response to the temperature of the hydrogen satisfying a third temperature threshold (e.g., a temperature threshold less than the second temperature threshold) and/or a third pressure threshold (e.g., a pressure threshold less than the second pressure threshold).

Although the gas turbine system 400 of the illustrated example of FIG. 4 includes certain components, it should be understood that the gas turbine system 400 may include other components in addition to those shown in FIG. 4. For example, the gas turbine system 400 can include additional valves and/or filters in connection with the first and/or second conduit(s) 402, 404. Additionally or alternatively, the gas turbine system 400 can include one or more trim vaporizers in connection with the first conduit(s) 402 to help heat the hydrogen during start-up operations, as discussed above.

Figure 5:
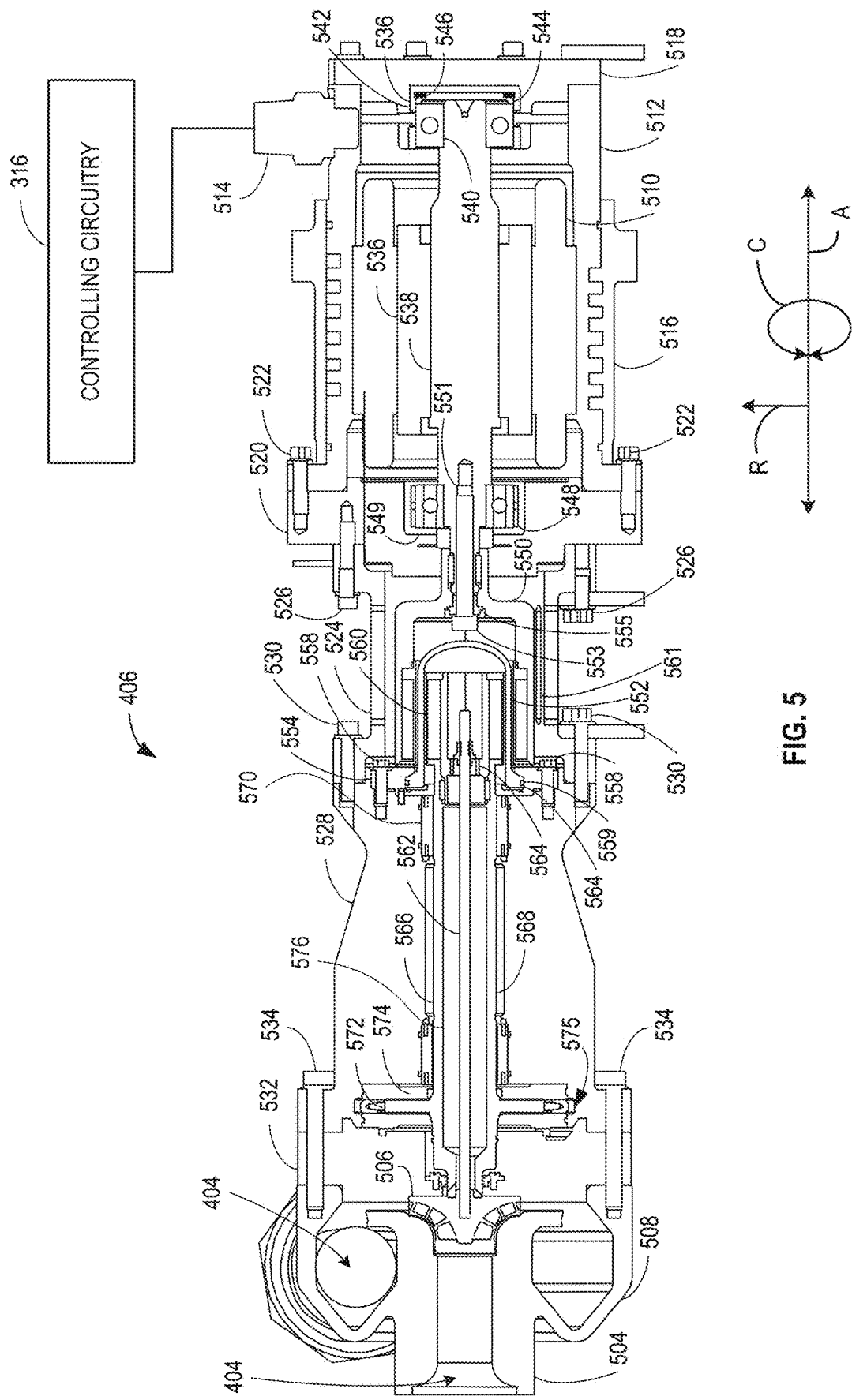
FIG. 5 illustrates an example heat exchange fluid pump that can be utilized in the second example gas turbine system of FIG. 4.

FIG. 5 is an example illustration of the heat exchange fluid pump 406 of the second example gas turbine system 400 of FIG. 4. In the illustrated example of FIG. 5, the heat exchange fluid pump 406 drives the heat exchange fluid through the second conduit(s) 404. Specifically, the heat exchange fluid flows through an inlet pipe 504 and encounters an impeller 506 (e.g., a compressor wheel) that rotates to drive the heat exchange fluid through a compressor collector 508 (e.g., a volute housing) fluidly coupled to the second conduit(s) 404. In turn, the second conduit(s) 404 can feed the heat exchange fluid to the intercooler 320 (FIG. 4). Accordingly, the heat exchange fluid pump can pump the heat exchange fluid to manage a thermal energy of the hydrogen in the first conduit(s) 402 (FIG. 4) and/or of other working fluids associated with the aircraft 10 of FIG. 1, the gas turbine 100 of FIG. 2, and/or any other suitable system, as discussed in further detail in association with FIG. 6.

In the illustrated example of FIG. 5, the heat exchange fluid pump 406 includes a motor 510 positioned in a motor housing 512. The motor 510 indirectly drives a rotation of the impeller 506, as discussed in further detail below. In FIG. 5, the motor 510 is an induction motor operatively coupled to the controlling circuitry 316 via a feedthrough connector 514 coupled to the motor housing 512. Accordingly, the controlling circuitry 316 controls a rotational speed of the motor 510 and, in turn, an output flow rate of the heat exchange fluid pump 406. For example, the controlling circuitry can operate the motor 510 based on a pressure and/or a temperature of the hydrogen in the first conduit(s) 402. In some examples, the controlling circuitry 316 can operate the motor 510 based on a pressure and/or a temperature of other working fluids affected by the heat exchange fluid. Additionally or alternatively, the controlling circuitry 316 can operate the motor 510 based on vibration measurements obtained by accelerometers operatively coupled to the heat exchange fluid pump 406 and/or the second conduit(s) 404.

In FIG. 5, the motor housing 512 can be at least partially surrounded by a cooling jacket 516 to prevent the motor 510 from overheating. An aft end of the motor housing 512 is coupled to an aft bearing housing 518. A forward end of the motor housing 512 is coupled to an intermediate bearing housing 520 via bolts 522. Further, the intermediate bearing housing 520 is coupled to a coupling housing 524 opposite the motor housing 512 via bolts 526. The coupling housing 524 is coupled to a forward bearing housing 528 opposite the intermediate bearing housing 520 via bolts 530. Moreover, the forward bearing housing 528 is coupled to a backplate 532 and the compressor collector 508 on an opposite side of the backplate 532 via bolts 534.

In the illustrated example of FIG. 5, a rotor 536 of the motor 510 is fixedly coupled to a shaft 538. As such, the motor 510 drives a rotation of the shaft 538. An aft end of the shaft 538 is supported by a first roller bearing 540 (e.g., a first rolling element bearing), which is coupled to the aft bearing housing 518. Specifically, the first roller bearing 540 is coupled to the aft bearing housing 518 via a first bearing cup 542 and a bearing shim 544 positioned between the first roller bearing 540 and the aft bearing housing 518. In the illustrated example of FIG. 5, a preload spring 546 is positioned between the first bearing cup 542 and the bearing shim 544. Similarly, a forward end of the shaft 538 is supported by a second roller bearing 548 (e.g., a second rolling element bearing) coupled to the intermediate bearing housing 520. Specifically, the second roller bearing 548 is coupled to the intermediate bearing housing 520 via a second bearing cup 549. The first roller bearing 540 and the second roller bearing 548 are packed with oil lubricant(s) (e.g., grease, motor oil, etc.) to reduce a resistance against the rotation of the shaft 538 and reduce wear encountered by the bearings 540, 548 as the shaft 538 rotates.

In the illustrated example of FIG. 5, the forward end of the shaft 538 extends at least partially through the intermediate bearing housing 520. An aft end of a first magnetic coupling 550 (e.g., a female magnetic coupling) is positioned around the forward end of the shaft 538. To couple the shaft 538 and the first magnetic coupling 550, a retention bolt 551 is inserted through the aft end of the first magnetic coupling 550 and the forward end of the shaft 538. Specifically, a width of a head 553 of the retention bolt 551 is greater than a width of an orifice 555 in the first magnetic coupling 550 through which the retention bolt 551 extends. As a result, the shaft 538 drives a rotation of the first magnetic coupling 550.

In the illustrated example of FIG. 5, the first magnetic coupling 550 is positioned around a barrier can 552 (e.g., a shroud). To couple the barrier can 552 to the forward bearing housing 528, a barrier can retainer 554 (e.g., a retainer ring) is positioned around a flange 556 of the barrier can 552 and coupled to an aft end of the forward bearing housing 528 via bolts 558. Further, an O-ring 559 is positioned between the flange 556 of the barrier can 552 and the barrier can retainer 554. The barrier can 552 hermetically seals the aft end of the forward bearing housing 528 and, in turn, prevents the heat exchange fluid from escaping. As such, the barrier can 552 prevents the heat exchange fluid from flowing past the coupling housing 524 and mixing with other fluids, such as the oil lubricant of the first roller bearing 540 and/or the second roller bearing 548, which would otherwise prevent thermal energy from being safely transferred between the heat exchange fluid and a working fluid. Additionally or alternatively, the barrier can 552 can hermetically seal the motor housing 512 to prevent the oil lubricant from mixing with and contaminating the heat exchange fluid.

In the illustrated example of FIG. 5, the barrier can 552 is positioned around a second magnetic coupling 560 (e.g., a male magnetic coupling), which is magnetically coupled to the first magnetic coupling 550. Specifically, opposite magnetic poles of the first magnetic coupling 550 and the second magnetic coupling 560 are aligned on opposite sides of the barrier can 552 to magnetically couple the first magnetic coupling 550 to the second magnetic coupling 560. As a result, the first magnetic coupling 550 and the second magnetic coupling 560 are rotatably interlocked. Accordingly, the first magnetic coupling 550 can drive a rotation of the second magnetic coupling 560. In some examples, the coupling housing 524 includes a vent 561 to enable a fluid (e.g., hydrogen, air, etc.) to circulate into and out of the coupling housing 524. In turn, as the barrier can 552 produces thermal energy as a result of encountering the rotating magnetic fields produced by the first magnetic coupling 550 and the second magnetic coupling 560, the heat exchange fluid can absorb the heat from the barrier can 552 to prevent the barrier can 552 from melting. In some examples, a fan drives the heat exchange fluid circulation through the vent 561 in the coupling housing 524. In some other examples, the vent 561 is open to atmospheric air, or another fluid enclosure, which provides the heat exchange fluid to absorb thermal energy from the barrier can 552.

In the illustrated example of FIG. 5, the second magnetic coupling 560 is coupled to a tie rod 562 via a top hat 564. The tie rod 562 extends through the forward bearing housing 528 and the backplate 532 to couple to the impeller 506. Additionally, the second magnetic coupling 560 is coupled to and/or extends from a shaft 566 positioned around the tie rod 562. Similarly, the shaft 566 extends through the forward bearing housing 528 and the backplate 532 to couple to the impeller 506. As a result, the tie rod 562 and the shaft 566 cause the impeller 506 to rotate with the second magnetic coupling 560 and pump the heat exchange fluid.

In the illustrated example of FIG. 5, an axial portion 568 of the shaft 566 is supported by journal bearing assemblies 570. Further, a radial portion 572 of the shaft 566 is supported by a thrust bearing assembly 574. For example, the journal bearing assemblies 570 and/or the thrust bearing assembly 574 can include foil bearings. In some examples, the journal bearing assemblies 570 and the thrust bearing assembly 574 are coupled to the forward bearing housing 528 via bolts. Additionally or alternatively, the thrust bearing assembly 574 can be coupled to one of the journal bearing assemblies 570.

In the illustrated example of FIG. 5, the heat exchange fluid pump 406 includes a secondary flow inlet 575 in the forward bearing housing 528. Specifically, the heat exchange fluid can enter the forward bearing housing 528 and flows between the radial portion 572 of the shaft 566 and the thrust bearing assembly 574. Further, a first portion of the heat exchange fluid that enters through the secondary flow inlet 575 can flow around the shaft 566 and into the compressor collector 508 between the impeller 506 and the backplate 532. A second portion of the heat exchange fluid that enters through the secondary flow inlet 575 can flow around the shaft 566 towards the barrier can 552. A separation between an aft end of the second magnetic coupling 560 and the barrier can 552 enables the heat exchange fluid to flow past the second magnetic coupling 560 and back through the shaft 566 towards the impeller 506. Further, the shaft 566 includes a duct 576 that guides the heat exchange fluid flowing therethrough between the backplate 532 and the impeller 506 causing the heat exchange fluid to enter the compressor collector 508. Accordingly, as the motor 510 drives the rotation of the shaft 538, the impeller 506 pumps the heat exchange fluid through the second conduit(s) 404.

Although the illustrated example of FIG. 5 presents an example implementation of the heat exchange fluid pump 406, it should be understood that the heat exchange fluid pump 406 can be implemented by other centrifugal fluid pumps. For example, the heat exchange fluid pump 406 can be a centrifugal pump with a motor mounted on a same shaft as the impeller 506. Furthermore, the heat exchange fluid pump 406 can include an alternative layout and/or additional or alternative components, such as bearings and/or other accessories (e.g., filters, gears, etc.) not presented in the illustrated example of FIG. 5.

Figure 6:
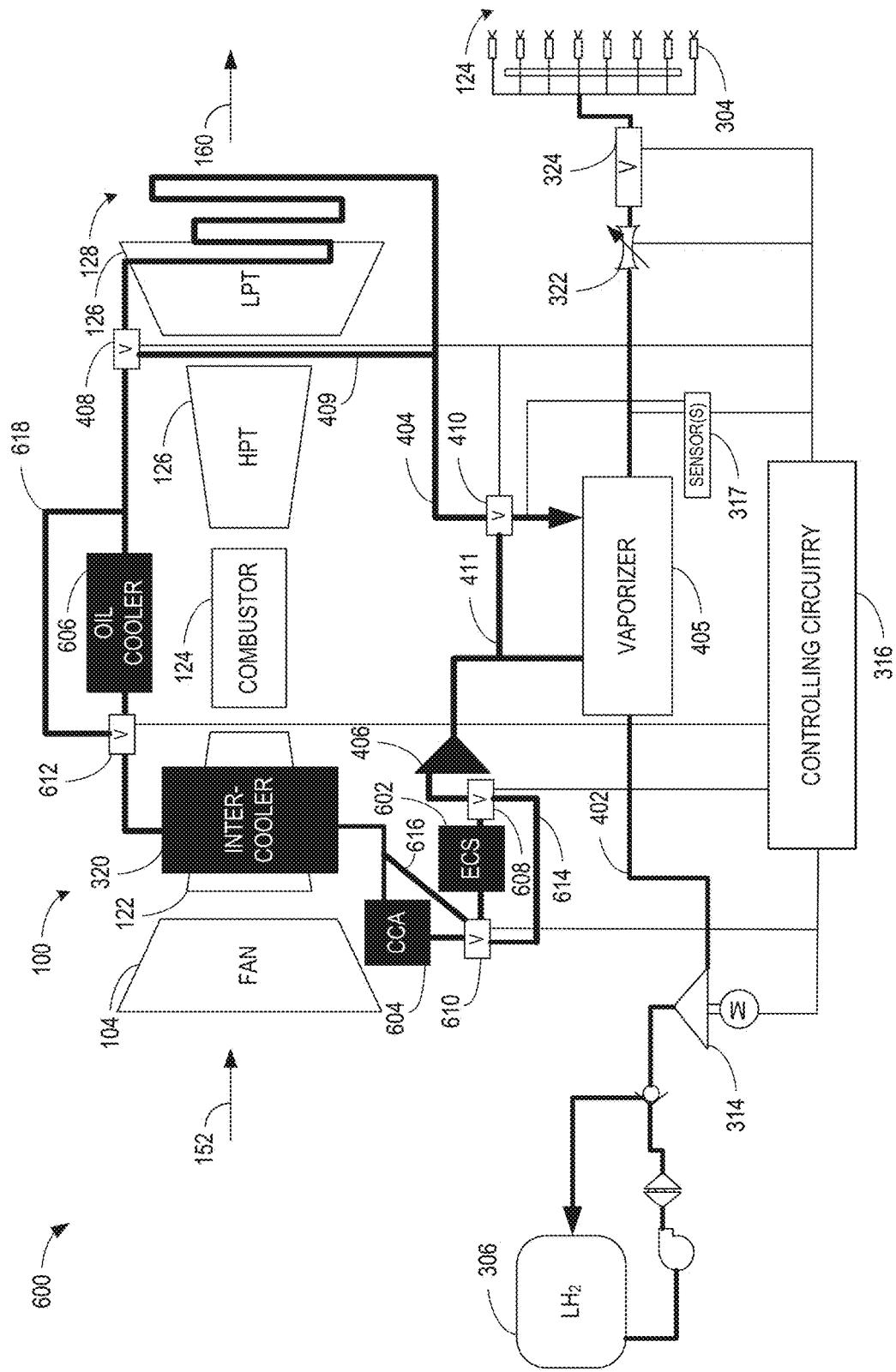
FIG. 6 is a schematic representation of a third example gas turbine system.

FIG. 6 is a schematic representation of a third example gas turbine system 600 in accordance with the teachings disclosed herein. In the illustrated example, the gas turbine system 300 includes the gas turbine 100. As shown, the fan 104, the compressor section 122, the combustor section 124, the turbine section 126, and the exhaust section 128 of the gas turbine 100 are simplified for exemplary purposes. Further, the third example gas turbine system 600 includes an environmental control system (ECS) heat exchanger 602, a cooled cooling air (CCA) heat exchanger 604, and an oil cooling heat exchanger 606 in connection with the second conduit(s) 404.

In the illustrated example of FIG. 6, the intercooler 320 is positioned between stages of the compressor section 122 (e.g., between a stage of the stator vanes 134 (FIG. 2) and the rotor blades 136 (FIG. 2) instead of between the fan 104 and the compressor section 122, as shown in the first and second gas turbine systems 300, 400 of FIGS. 3 and 4. As such, the air 152 flowing through the intercooler 320 in the third gas turbine system 600 may be warmer than the air 152 flowing through the intercooler 320 in the first and/or second gas turbine systems 300, 400 because the compressor section 122 has begun to compress the air 152, which also heats up the air 152. Accordingly, in FIG. 6, the intercooler 320 may heat the heat exchange fluid to a higher temperature. Moreover, in FIG. 6, the heat exchange fluid may extract more thermal energy from the air 152, which cools and compresses the air 152 and allows the compressor section 122 to input less work while creating an increased overall pressure ratio.

In FIG. 6, the heat exchange fluid pump 406 drives the heat exchange fluid to the ECS heat exchanger 602, to the CCA heat exchanger 604, to the intercooler 320, to the oil cooling heat exchanger 606, at least partially around and/or through the aft portion of the gas turbine 100, and to the vaporizer 405, in that respective order. However, in some examples, the ECS heat exchanger 602, the CCA heat exchanger 604, and the oil cooling heat exchanger 606 are arranged differently in the third gas turbine system 600. For example, the ECS heat exchanger 602 and/or the CCA heat exchanger 604 can be in connection with the second conduit(s) 404 between intercooler 320 and the oil cooling heat exchanger 606 or between the oil cooling heat exchanger 606 and the aft portion of the gas turbine 100. Additionally or alternatively, the CCA heat exchanger 604 can be positioned between the heat exchange fluid pump 406 and the ECS heat exchanger 602. Moreover, the oil cooling heat exchanger 606 can be in connection with the second conduit(s) between a) the heat exchange fluid pump 406 and the ECS heat exchanger 602, b) the ECS heat exchanger 602 and the CCA heat exchanger 604, or c) the CCA heat exchanger 604 and the intercooler 320. That is, respective positions of the ECS heat exchanger 602, the CCA heat exchanger 604, and the oil cooling heat exchanger 606 can be adjusted based on an amount of thermal energy to be transferred to the heat exchange fluid and/or the other working fluids associated with the ECS heat exchanger 602, the CCA heat exchanger 604, and the oil cooling heat exchanger 606.

In the illustrated example of FIG. 6, in addition to being in connection with the second conduit(s) 404, the ECS heat exchanger 602 is in connection an environmental control system that supplies air to the fuselage 12 (FIG. 1) of the aircraft 10 (FIG. 1) for pressurization. For example, the ECS heat exchanger 602 can receive a portion of the air 152 that bleeds from the compressor section 122. Accordingly, the air 152 can exit an axial flow path of the gas turbine 100 and enter the ECS heat exchanger 602. In turn, the heat exchange fluid passing through the ECS heat exchanger 602 can cool and compress the air 152 before the air 152 is provided to the fuselage 12. In that respect, the heat exchange fluid cools the air 152 to be supplied to the fuselage 12 while the air 152 simultaneously warms the heat exchange fluid. In FIG. 6, the ECS heat exchanger 602 may be implemented by a plate heat exchanger (e.g., a plate and fin heat exchanger, a pillow plate heat exchanger, a plate and frame heat exchanger, a plate and shell heat exchanger, a spiral plate heat exchanger, etc.), a shell and tube heat exchanger (e.g., a double pipe heat exchanger, etc.), a pin-fin heat exchanger, or any other suitable heat exchanger. The ECS heat exchanger 602 may be formed of metal, graphite, ceramic, or any other material with a high thermal conductivity and melting point.

In the illustrated example of FIG. 6, the CCA heat exchanger 604 can receive a portion of the air 152 that bleeds from the compressor section 122 as well as the heat exchange fluid from the second conduit(s) 404. Accordingly, the air 152 can exit an axial flow path of the gas turbine 100 and enter the CCA heat exchanger 604. In turn, a thermal energy transfer can occur between the bleed air 152 and the heat exchange fluid in the CCA heat exchanger 604. Accordingly, the CCA heat exchanger 604 enables the bleed air 152 to warm the heat exchange fluid while the heat exchange fluid cools the bleed air 152 and causes the bleed air 152 to compress. In turn, the cooled and compressed bleed air 152 can be returned to the compressor section 122 with a higher oxygen concentration that enables a greater portion of the returned bleed air 152 to partake in a combustion reaction with the hydrogen in the combustor section 124. Additionally, returning the cooled bleed air 152 to the compressor section 122, which then provides the cooled bleed air to the combustor section 124, can help reduce a flame temperature within the combustor section 124 and, thus, help protect the nozzle(s) 304. In FIG. 6, the CCA heat exchanger 604 may be implemented by a plate heat exchanger(s) (e.g., a plate fin heat exchanger(s), a pillow plate heat exchanger(s), a plate and frame heat exchanger(s), a plate and shell heat exchanger(s), a spiral plate heat exchanger(s), etc.), a shell and tube heat exchanger(s) (e.g., a double pipe heat exchanger(s)), etc.), a pin-fin heat exchanger, a plate-fin heat exchanger, or any other suitable heat exchanger. The CCA heat exchanger 604 may be formed of metal, graphite, ceramic, or any other material with a high thermal conductivity and melting point.

In the illustrated example of FIG. 6, the oil cooling heat exchanger 606 can receive a lubricant, such as oil, from a lubricant supply (e.g., an oil tank) and/or an actuation system (e.g., the hydrogen pump 314, the heat exchange fluid pump 406, etc.) as well as the heat exchange fluid from the second conduit(s) 404. As such, the oil cooling heat exchanger 606 causes the oil to warm the heat exchange fluid while the heat exchange fluid cools the oil. In turn, the oil cooling heat exchanger 606 helps prevent the oil from overheating and encountering a viscosity change that would otherwise impact the lubrication provided to the actuation system. In FIG. 6, the oil cooling heat exchanger 606 may be implemented by a shell and tube heat exchanger(s) (e.g., a double pipe heat exchanger(s)), etc.) or any other suitable heat exchanger. The oil cooling heat exchanger 606 may be formed of metal, graphite, ceramic, a pin-fin heat exchanger, a plate-fin heat exchanger, or any other material with a high thermal conductivity and melting point.

In the illustrated example of FIG. 6, the third gas turbine system 600 includes a third bypass valve 608 in connection with the second conduit(s) 404 upstream of the ECS heat exchanger 602, a fourth bypass valve 610 in connection with the second conduit(s) 404 upstream of the CCA heat exchanger 604, and a fifth bypass valve 612 in connection with the second conduit(s) 404 upstream of the oil cooling heat exchanger 606. Similar to the first and second bypass valves 408, 410, the controlling circuitry 316 can control a position of the third bypass valve 608, the fourth bypass valve 610, and the fifth bypass valve 612. For example, the controlling circuitry 316 can control the positions of the respective bypass valves 608, 610, 612 based on the temperature and/or the pressure of the hydrogen in the first conduit(s) 402. Specifically, when the temperature of the hydrogen satisfies (e.g., is greater than) a temperature threshold and/or when the pressure of the hydrogen satisfies (e.g., is greater than) a pressure threshold, the controlling circuitry 316 can at least partially open the third bypass valve 608, the fourth bypass valve 610, and/or the fifth bypass valve 612 to reduce the amount of thermal energy the heat exchange fluid is receiving and, in turn, reduce the amount of thermal energy the heat exchange fluid is transferring to the hydrogen when passing through the vaporizer 405.

For example, when the temperature and/or the pressure of the hydrogen satisfies the temperature threshold and/or the pressure threshold, the controlling circuitry can at least partially open the third bypass valve 608 to cause at least a portion of the heat exchange fluid to flow through a third bypass conduit 614 instead of the ECS heat exchanger 602. Similarly, when the temperature and/or the pressure of the hydrogen satisfies the temperature threshold and/or the pressure threshold, the controlling circuitry 316 can at least partially open the fourth bypass valve 610 to cause at least a portion of the heat exchange fluid to flow through a fourth bypass conduit 616 instead of the CCA heat exchanger 604. Likewise, when the temperature and/or the pressure of the hydrogen satisfies the temperature threshold and/or the pressure threshold, the controlling circuitry 316 can at least partially open the fifth bypass valve 612 to cause at least a portion of the heat exchange fluid to flow through a fifth bypass conduit 618 instead of the oil cooling heat exchanger 606.

In addition to considering the temperature and/or the pressure of the hydrogen in the first conduit(s) 402, the controlling circuitry 316 can also consider a temperature and/or a pressure of the bleed air to be supplied to the fuselage or to be returned to the compressor section 122 when determining whether to operate (e.g., at least partially open or close) the third bypass valve 608 and the fourth bypass valve 610, respectively. For example, when the bleed air associated with the environmental control system satisfies (e.g., is less than) a temperature threshold, the controlling circuitry 316 can at least partially open the third bypass valve 608 to enable at least a portion of the heat exchange fluid to bypass the ECS heat exchanger 602 and, in turn, reduce the amount of heat the heat exchange fluid extracts from the bleed air.

Similarly, the controlling circuitry 316 can consider a temperature of the lubricant being provided to the actuation system associated with the oil cooling heat exchanger 606 when determining whether to operate (e.g., at least partially open or close) the fifth bypass valve 612. For example, the controlling circuitry 316 can adjust the fifth bypass valve 612 to be at least partially open in response to the temperature of the lubricant satisfying (e.g., being less than) a temperature threshold. In that respect, the controlling circuitry 316 can prevent the heat exchange fluid from overcooling the lubricant, which would otherwise cause the lubricant to congeal.

Although the gas turbine system 600 of the illustrated example of FIG. 6 includes certain components, it should be understood that the gas turbine system 600 may include other components in addition to those shown in FIG. 6. For example, the gas turbine system 600 can include additional valves and/or filters in connection with the first and/or second conduit(s) 402, 404. Additionally or alternatively, the gas turbine system 600 can include one or more trim vaporizers in connection with the first conduit(s) 402 to help heat the hydrogen during start-up operations, as discussed above.

Figure 7:
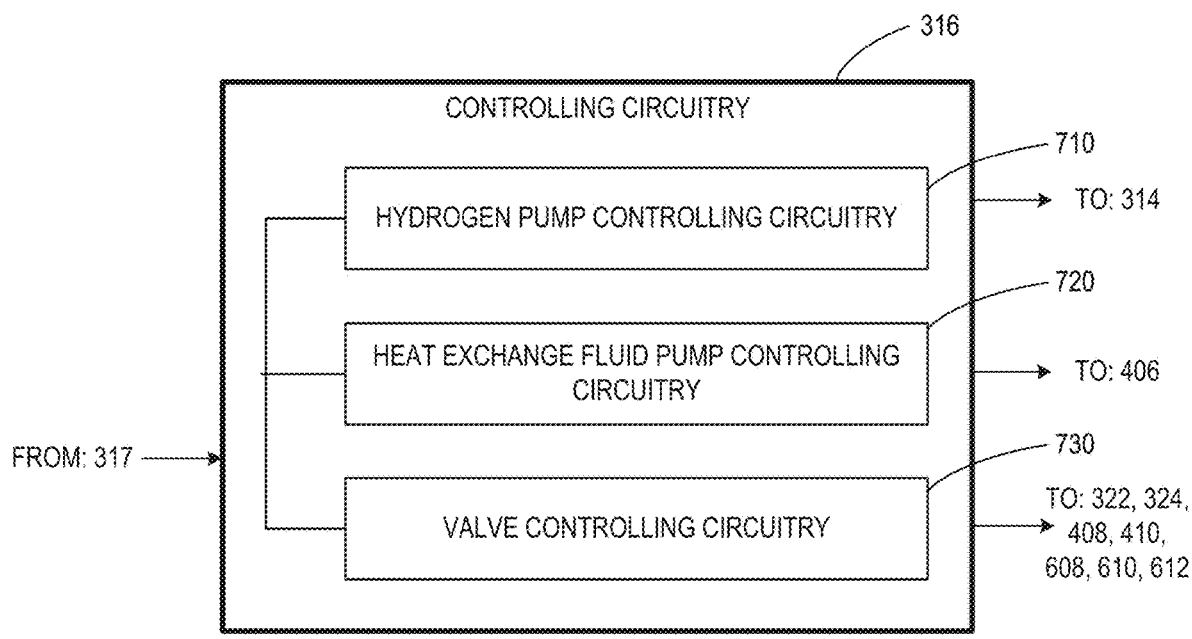
FIG. 7 is a block diagram of example controlling circuitry that facilitates control of fluid flow in the first example gas turbine system of FIG. 3, the second example gas turbine system of FIG. 4, and/or the third example gas turbine system of FIG. 6.

FIG. 7 is a block diagram of an example implementation of the controlling circuitry 316 of FIGS. 3-6 to control a temperature(s) of a fluid(s) in the first gas turbine system 300 of FIG. 3, the second gas turbine system 400 of FIG. 4, and/or the third gas turbine system 600 of FIG. 6. The controlling circuitry 316 of FIGS. 3, 4, 6, and/or 7 may be instantiated (e.g., creating an instance of, bring into being for any length of time, materialize, implement, etc.) by processor circuitry such as a central processing unit executing instructions. Additionally or alternatively, the controlling circuitry 316 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 7 may, thus, be instantiated at the same or different times. Some or all of the circuitry of FIG. 7 may be instantiated, for example, in one or more threads executing concurrently on hardware and/or in series on hardware. Moreover, in some examples, some or all of the circuitry of FIG. 7 may be implemented by one or more virtual machines and/or containers executing on the microprocessor.

In the illustrated example of FIG. 7, the controlling circuitry 316 includes hydrogen pump controlling circuitry 710, heat exchange fluid pump controlling circuitry 720, and valve controlling circuitry 730. In FIG. 7, the controlling circuitry 316 is communicatively coupled to the hydrogen pump 314, the sensor(s) 317, the fuel metering valve(s) 322, the safety valve 324, the heat exchange fluid pump 406, the first bypass valve 408, the second bypass valve 410, the third bypass valve 608, the fourth bypass valve 610, and the fifth bypass valve 612. As mentioned above, although the sensor(s) 317 are depicted as in connection with the first conduit(s) 402 and the second conduit(s) 404 in certain locations, it should be understood the sensor(s) 317 can obtain measurements at any location along the first conduit(s) 402 and the second conduit(s) 404 and may be located at various points throughout the first conduit(s) 402 and the second conduit(s) 404.

In FIG. 7, the hydrogen pump controlling circuitry 710 controls an output of the hydrogen pump 314. For example, the hydrogen pump controlling circuitry 710 can cause transmission of a drive signal to the hydrogen pump 314 based on a desired flow rate of the hydrogen in the conduit(s) 302 of FIG. 3 and/or the first conduit(s) 402 of FIGS. 4 and 6. Specifically, the hydrogen pump controlling circuitry 710 can adjust a voltage or a current of the drive signal to adjust the rate at which a motor of the hydrogen pump 314 drives an impeller that propels the hydrogen through the conduit(s) 302, 402. In some examples, the hydrogen pump controlling circuitry 710 determines the drive signal based on an input from the sensor(s) 317. For example, the hydrogen pump controlling circuitry 710 can increase the output of the hydrogen pump in response to a temperature of the hydrogen satisfying (e.g., being greater than, being greater than or equal to, etc.) a first temperature threshold and/or a pressure of the hydrogen satisfying (e.g., being greater than, being greater than or equal to, etc.) a first pressure threshold. Conversely, the hydrogen pump controlling circuitry 710 can reduce the output of the hydrogen pump in response to the temperature of the hydrogen satisfying (e.g., being less than, being less than or equal to, etc.) a second temperature threshold and/or the pressure of the hydrogen satisfying (e.g., being less than, being less than or equal to, etc.) a second pressure threshold.

In FIG. 7, the heat exchange fluid pump controlling circuitry 720 controls an output of the heat exchange fluid pump 406. For example, the heat exchange fluid pump controlling circuitry 720 can cause transmission of a drive signal to the heat exchange fluid pump 406 based on a desired flow rate of the heat exchange fluid in the second conduit(s) 404 of FIGS. 4 and/or 6. That is, the heat exchange fluid pump controlling circuitry 720 can control transmission of a voltage or a current to the heat exchange fluid pump to control a rate at which the motor 510 (FIG. 5) drives the impeller 506 (FIG. 5) and, in turn, control an output of the heat exchange fluid pump 406. As such, the heat exchange fluid pump controlling circuitry 720 can control a flow rate of the heat exchange fluid in the second conduit(s) 404, which helps control an amount of thermal energy transferred between the heat exchange fluid and the hydrogen in the first conduit(s) 402, the air 152 (e.g., the air 152 associated with the intercooler 320 (FIGS. 4-6), the air 152 associated with the ECS heat exchanger 602 (FIG. 6), and/or the air 152 associated with the CCA heat exchanger 604 (FIG. 6), and/or the lubricant associated with the oil cooling heat exchanger 606 (FIG. 6).

For example, the heat exchange fluid pump controlling circuitry 720 can cause the heat exchange fluid pump 406 to increase a flow rate of the heat exchange fluid in the second conduit(s) 404 in response to the temperature of the hydrogen satisfying (e.g., being less than) a first temperature threshold such that warmed heat exchange fluid can be induced into the vaporizer 405 at a faster rate, which enables the hydrogen to receive more thermal energy in the vaporizer 405 in preparation for combustion. Similarly, the heat exchange fluid pump controlling circuitry 720 can cause the heat exchange fluid pump to decrease the flow rate of the heat exchange fluid in the second conduit(s) in response to the temperature of the hydrogen satisfying (e.g., being greater than a second threshold such that the heat exchange fluid remains in the vaporizer 405 for a longer period and, thus, transfers less thermal energy to the hydrogen in the vaporizer to prevent the hydrogen from overheating and/or becoming over-pressurized in the first conduit(s) 402.

In the illustrated example of FIG. 7, the valve controlling circuitry 730 controls positions of the fuel metering valve(s) 322, the safety valve 324, the first bypass valve 408, the second bypass valve 410, the third bypass valve 608, the fourth bypass valve 610, and the fifth bypass valve 612. For example, the valve controlling circuitry 730 can control a position of the fuel metering valve(s) 322 to control the flow rate of the hydrogen entering the combustor section 124 (FIGS. 3-4 and 6). Further, the valve controlling circuitry 730 can control a position of the safety valve 324. For example, the valve controlling circuitry 730 can cause the safety valve 324 to close to halt injections of the hydrogen into the combustor section 124 and cause the gas turbine 100 to producing propulsion. In addition, the valve controlling circuitry 730 can cause the first bypass valve 408 and/or the second bypass valve to open to reduce the amount of thermal energy being transferred to the hydrogen in the vaporizer 405 in response to the hydrogen in the first conduit(s) 402 satisfying (e.g., being greater than) a temperature threshold and/or a pressure threshold.

In the illustrated example of FIG. 7, the valve controlling circuitry 730 can cause the third bypass valve 608 to open to reduce the amount of thermal energy being extracted from the air 152 in the ECS heat exchanger 602 in response to the air 152 in the ECS heat exchanger 602 satisfying (e.g., being less than) a temperature threshold and/or a pressure threshold. Likewise, the valve controlling circuitry 730 can cause the fourth bypass valve 610 to open to reduce the amount of thermal energy being extracted from the air in the CCA heat exchanger 604 in response to the air 152 in the CCA heat exchanger satisfying (e.g., being less than) a temperature threshold and/or a pressure threshold. Similarly, the valve controlling circuitry 730 can cause the fifth bypass valve 612 to open to reduce the amount of thermal energy being extracted from the lubricant in the oil cooling heat exchanger 606 in response to the lubricant in the oil cooling heat exchanger 606 satisfying (e.g., being less than) a temperature threshold.

In some examples, the first gas turbine system 300, the second gas turbine system 400, and/or the third gas turbine system 600 includes means for compressing a first fluid. For example, the means for compressing may be implemented by the compressor section 122 of FIGS. 2-4 and 6.

In some examples, the first gas turbine system 300, the second gas turbine system 400, and/or the third gas turbine system 600 includes first means for exchanging thermal energy to transfer heat between the first fluid and a second fluid. For example, the first means for exchanging thermal energy may be implemented by the intercooler 320 of FIGS. 3-4 and 6.

In some examples, the first gas turbine system 300, the second gas turbine system 400, and/or the third gas turbine system 600 includes means for combusting positioned aft of the means for compressing. For example, the means for combusting may be implemented by the combustor section 124 of FIGS. 2-4 and 6.

In some examples, the first gas turbine system 300, the second gas turbine system 400, and/or the third gas turbine system 600 includes second means for exchanging thermal energy to transfer heat between the first fluid and the second fluid. For example, the second means for exchanging thermal energy may be implemented by the conduit(s) 302 of FIG. 3 where the conduit(s) 302 carry the hydrogen at least partially around and/or through the turbine section 126 and/or the exhaust section 128 of the gas turbine 100. Additionally or alternatively, the second means for exchanging thermal energy may be implemented by the second conduit(s) 404 of FIGS. 4 and/or 6 where the second conduit(s) 404 carry the heat exchange fluid at least partially around and/or through the turbine section 126 and/or the exhaust section 128 of the gas turbine 100.

In some examples, the second gas turbine system 400 and/or the third gas turbine system 600 includes third means for exchanging thermal energy to transfer heat between the second fluid and a third fluid. For example, the third means for exchanging thermal energy may be implemented by the vaporizer 405 of FIGS. 4 and/or 6.

In some examples, the second gas turbine system 400 and/or the third gas turbine system 600 includes means for pumping the second fluid. For example, the means for pumping the second fluid may be implemented by the heat exchange fluid pump 406 of FIGS. 4-6.

In some examples, the second gas turbine system 400 and/or the third gas turbine system 600 includes means for controlling the means for pumping the second fluid. For example, the means for controlling may be implemented by the controlling circuitry 316 of FIGS. 3-7. In some examples, the controlling circuitry 316 may be instantiated by processor circuitry such as the example processor circuitry 1112 of FIG. 11 executing machine executable instructions such as those implemented by at least blocks 804 of FIG. 8, blocks 904, 906, 910, 912, 916, and/or 918 of FIG. 9, and/or blocks 1004, 1006, 1008, 1010, 1014, 1016, 1022, 1024, 1028, 1030, 1034, and/or 1036 of FIG. 10. In some examples, the controlling circuitry 316 may be instantiated by any other combination of hardware, software, and/or firmware. For example, the controlling circuitry 316 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the second gas turbine system 400 and/or the third gas turbine system 600 includes means for causing the second fluid to bypass the third means for exchanging thermal energy in response to a flow rate of the third fluid not satisfying a flow rate threshold or in response to a temperature of the third fluid satisfying a temperature threshold. For example, the means causing the second fluid to bypass the third means for exchanging thermal energy may be implemented by the controlling circuitry 316, the second bypass valve 410, and/or the second bypass conduit 411 of FIGS. 4 and/or 6.

While an example manner of implementing the controlling circuitry 316 of FIGS. 3-6 is illustrated in FIG. 7, one or more of the elements, processes, and/or devices illustrated in FIG. 7 may be combined, divided, re-arranged, omitted, eliminated, and/or implemented in any other way. Further, the example hydrogen pump controlling circuitry 710, the example heat exchange fluid pump controlling circuitry 720, the example valve controlling circuitry 730, and/or, more generally, the example controlling circuitry 316 of FIGS. 3-6, may be implemented by hardware alone or by hardware in combination with software and/or firmware. Thus, for example, any of the example hydrogen pump controlling circuitry 710, the example heat exchange fluid pump controlling circuitry 720, the example valve controlling circuitry 730, and/or, more generally, the example controlling circuitry 316, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example controlling circuitry 316 of FIGS. 3-6 may include one or more elements, processes, and/or devices in addition to, or instead of, those illustrated in FIG. 7, and/or may include more than one of any or all of the illustrated elements, processes, and devices.

Figure 8:
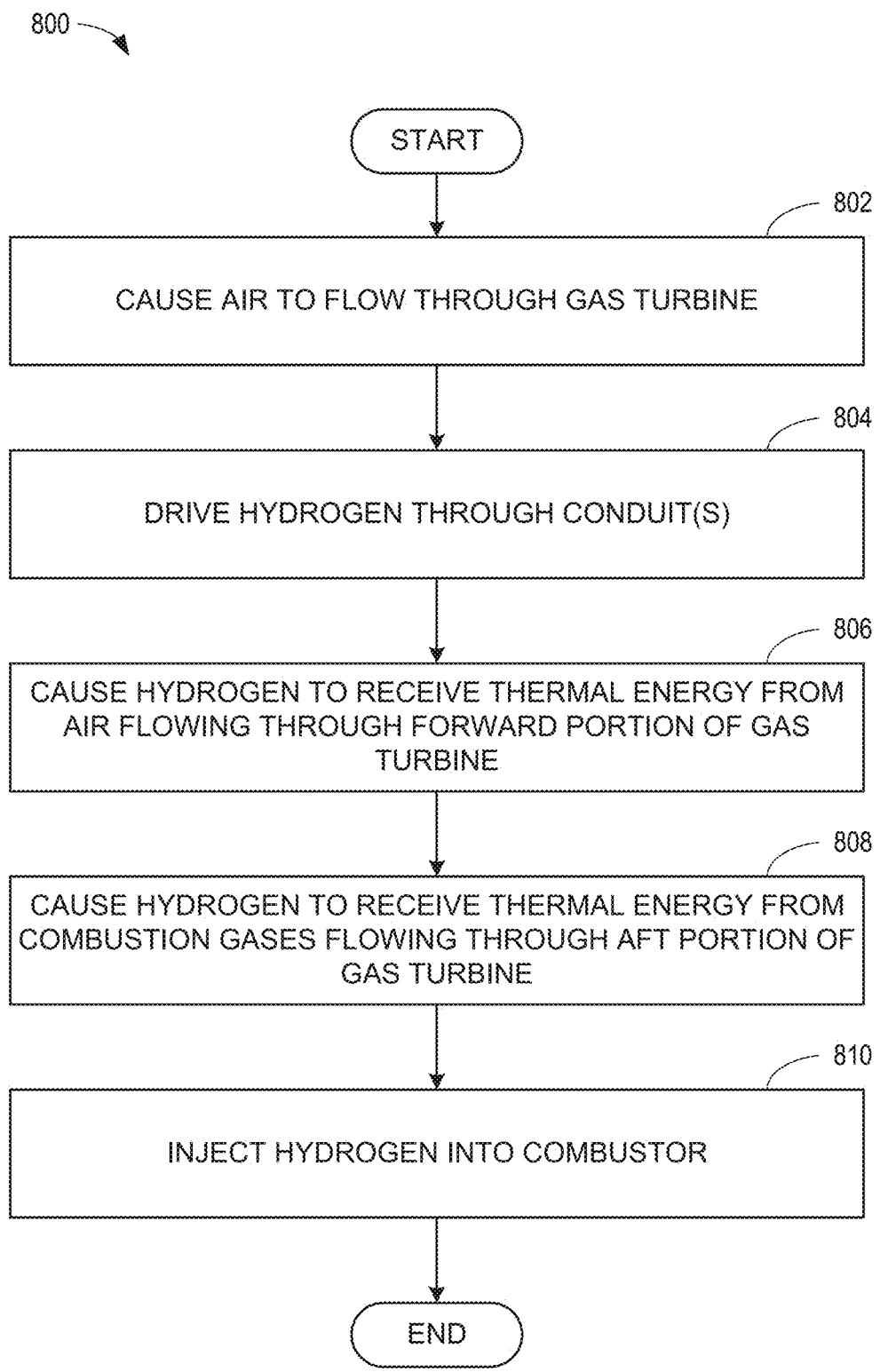
FIG. 8 is a first flowchart representative of example operations associated with the first example gas turbine system of FIG. 3.
Figure 9:
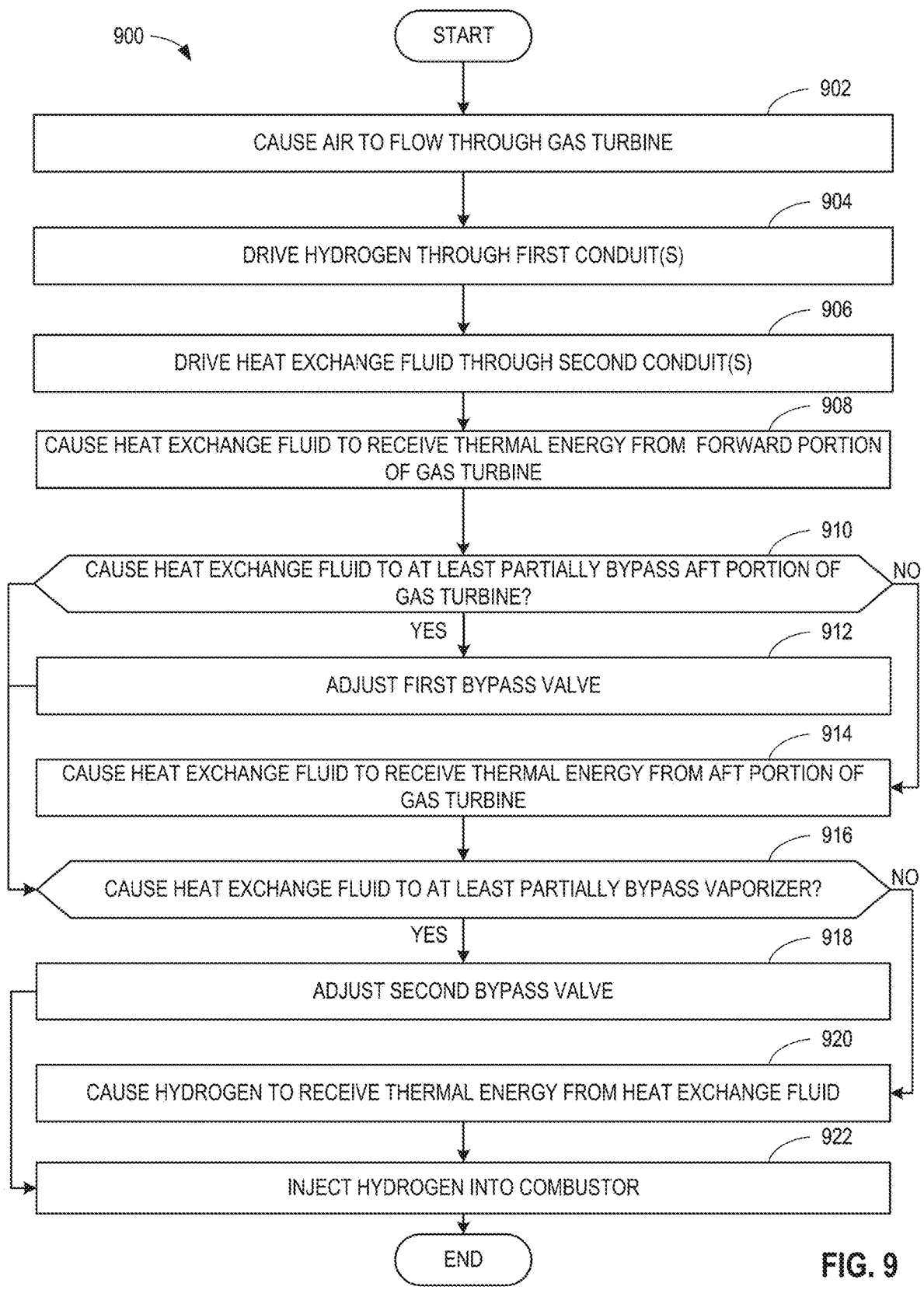
FIG. 9 is a second flowchart representative of example operations associated with the second example gas turbine system of FIG. 4.
Figure 10:
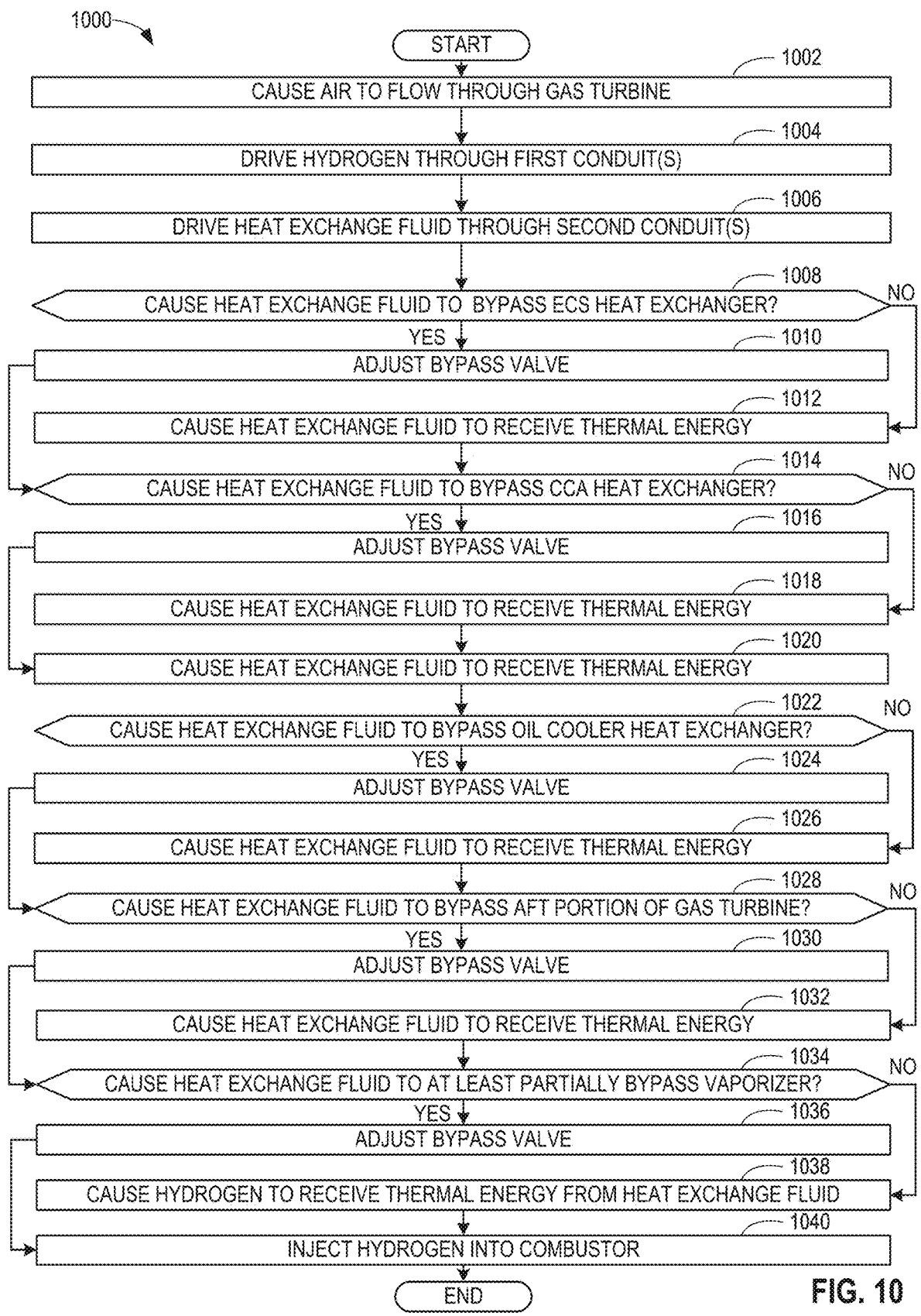
FIG. 10 is a third flowchart representative of example operations associated with the third example gas turbine system of FIG. 6.

A flowchart at least partially representative of example hardware logic circuitry, machine readable instructions, hardware implemented state machines, and/or any combination thereof for implementing the controlling circuitry 316 of FIG. 7 is shown in FIGS. 8-10. The machine readable instructions may be one or more executable programs or portion(s) of an executable program for execution by processor circuitry, such as the processor circuitry 1112 shown in the example processor platform 1100 discussed below in connection with FIG. 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 8-10, many other methods of implementing the example controlling circuitry 316 and/or, more generally, the first gas turbine system 300, the second gas turbine system 400, and/or the third gas turbine system 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8-10 may be at least partially implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

FIG. 8 is a flowchart representative of example machine readable instructions and/or example operations 800 that may be partially executed and/or instantiated by processor circuitry to operate the first gas turbine system 300 of FIG. 3. The operations 800 of FIG. 8 begin at block 802, at which the fan 104 (FIGS. 2-4 and/or 6) causes the air 152 (FIGS. 2-4 and/or 6) to flow through the gas turbine 100 (FIGS. 2-4 and/or 6). For example, the fan 104 can rotate to drive the air 152 through the gas turbine 100.

At block 804, the controlling circuitry 316 (FIGS. 3-7) causes the hydrogen pump 314 (FIGS. 3-4 and/or 6) to drive hydrogen through the conduit(s) 302 (FIG. 3). For example, the hydrogen pump controlling circuitry 710 (FIG. 7) can cause transmission of a drive signal to the hydrogen pump 314 to control an output flow rate of the hydrogen. In some examples, the hydrogen pump controlling circuitry 710 adjusts the drive signal based on a flow rate of the hydrogen measured by the sensor(s) 317 (FIGS. 3-4 and/or 6) such that a burn flow rate of the hydrogen in the combustor section 124 satisfies (e.g., is greater than or equal to) a burn flow rate threshold.

At block 806, the intercooler 320 (FIGS. 3-4 and/or 6) causes the hydrogen to receive thermal energy from the air 152 flowing through a forward portion of the gas turbine 100 (e.g., a portion of the gas turbine 100 forward of the combustor section 124 (FIGS. 2-4 and/or 6). For example, the intercooler 320 can receive the hydrogen in a liquid form via the conduit(s) 302. In turn, the intercooler 320 enables the heat exchange fluid to extract heat from the air 152 flowing through the intercooler 320. In turn, the intercooler 320 also enables the hydrogen to cool the air 152.

At block 808, the conduit(s) 302 cause the hydrogen to receive thermal energy from the combustion gases 160 (FIGS. 2-4 and/or 6) flowing through an aft portion of the gas turbine 100 (e.g., a portion of the gas turbine 100 aft of the combustor section 124). For example, the conduit(s) 302 can cause the hydrogen to flow at least partially around and/or through an aft portion of the gas turbine 100. Specifically, the conduit(s) 302 can carry the hydrogen at least partially around and/or through the turbine section 126 (FIGS. 2-4 and/or 6) and/or the exhaust section 128 (FIGS. 2-4 and/or 6). In turn, the hydrogen in the conduit(s) 302 can receive thermal energy from the combustion gases 160 flowing through the turbine section 126 and/or the exhaust section 128. In some examples, the combustion gases 160 cause the hydrogen to vaporize (e.g., transition from a liquid state to a gaseous state or super-critical phase) as the conduit(s) 302 carry the hydrogen at least partially around and/or through the turbine section 126 and/or the exhaust section 128.

At block 810, the nozzle(s) 304 (FIGS. 3-4 and/or 6) inject the hydrogen into the combustor section 124. As a result, the hydrogen can mix with the air 152 in the combustor section 124 where the air 152 and the hydrogen partake in a combustion reaction to produce mechanical energy that drives the rotor blades 144 of the turbine section 126 and, in turn, drives a rotation of the LP shaft 146 (FIG. 2) and the HP shaft 148 (FIG. 2). Accordingly, the rotation of the LP shaft 146 and the HP shaft 148 can cause the fan 104 and the rotor blades 136 (FIG. 2) of the compressor section 122 to rotate and pull more of the air 152 through the gas turbine 100. Thus, the combustion can help propel the aircraft 10 (FIG. 1). Alternatively, when the gas turbine 100 is a generator, the rotation of the LP shaft 146 and/or the HP shaft 148 can cause electricity to be produced.

FIG. 9 is a flowchart representative of example machine readable instructions and/or example operations 900 that may be partially executed and/or instantiated by processor circuitry to operate the second gas turbine system 400 of FIG. 4. The operations 900 of FIG. 9 begin at block 902, at which the fan 104 (FIGS. 2-4 and/or 6) causes the air 152 (FIGS. 2-4 and/or 6) to flow through the gas turbine 100 (FIGS. 2-4 and/or 6). For example, the fan 104 can rotate to drive the air 152 through the gas turbine 100.

At block 904, the controlling circuitry 316 (FIGS. 3-7) causes the hydrogen pump 314 (FIGS. 3-4 and/or 6) to drive hydrogen through the first conduit(s) 402 (FIGS. 4 and/or 6). For example, the hydrogen pump controlling circuitry 710 (FIG. 7) can cause transmission of a drive signal to the hydrogen pump 314 to control an output flow rate of the hydrogen. In some examples, the hydrogen pump controlling circuitry 710 adjusts the drive signal to the hydrogen pump 314 based on a temperature, a pressure, and/or a flow rate of the hydrogen measured by the sensor(s) 317 (FIGS. 3-4 and/or 6).

At block 906, the controlling circuitry 316 causes the heat exchange fluid pump 406 (FIGS. 4 and/or 6) to drive the heat exchange fluid through the second conduit(s) 404 (FIGS. 4 and/or 6). For example, the heat exchange fluid pump controlling circuitry 720 (FIG. 7) can cause transmission of a drive signal to the heat exchange fluid pump 406 to control an output flow rate of the heat exchange fluid. In some examples, the heat exchange fluid pump controlling circuitry 720 adjusts the drive signal to the heat exchange fluid pump 406 based on the temperature, the pressure, and/or the flow rate of the hydrogen in the first conduit(s) 402.

At block 908, the intercooler 320 (FIGS. 3-4 and/or 6) causes the heat exchange fluid to receive thermal energy from the air 152 flowing through a forward portion of the gas turbine 100 (e.g., a portion of the gas turbine 100 forward of the combustor section 124 (FIGS. 2-4 and/or 6)). For example, the intercooler 320 can be positioned between the fan 104 and the compressor section 122 (FIGS. 2-4 and/or 6) of the gas turbine 100. Further, the intercooler 320 can receive the heat exchange fluid via the second conduit(s) 404 or the second conduit(s) 404 can pass through the intercooler 320. In turn, the intercooler 320 enables the heat exchange fluid to extract heat from the air 152 flowing through the intercooler 320. In turn, the intercooler 320 also enables the heat exchange fluid to cool the air 152 while the air warms the heat exchange fluid.

At block 910, the controlling circuitry 316 determines whether to cause the heat exchange fluid to at least partially bypass an aft portion of the gas turbine 100 (e.g., a portion of the gas turbine 100 aft of the combustor section 124). For example, the valve controlling circuitry 730 (FIG. 7) can compare a temperature of the hydrogen in the first conduit(s) 402 to a first temperature threshold and/or compare a pressure of the hydrogen in the first conduit(s) 402 to a first pressure threshold. In response to the temperature of the hydrogen satisfying (e.g., being greater than) the first temperature threshold and/or the pressure of the hydrogen satisfying (e.g., being greater than) the first pressure threshold, the operations proceed to block 912. Otherwise, in response to the temperature of the hydrogen not satisfying the first temperature threshold and/or the pressure of the hydrogen in the first conduit(s) 402 not satisfying the first pressure threshold, the operations proceed to block 914.

At block 912, the controlling circuitry 316 adjusts a position of the first bypass valve 408 (FIGS. 4 and/or 6). For example, the valve controlling circuitry 730 can cause the first bypass valve 408 to at least partially open to enable the heat exchange fluid to enter the first bypass conduit 409 (FIGS. 4 and/or 6). In some examples, the heat exchange fluid flowing through the first bypass conduit 409 does not receive thermal energy from the combustion gases 160 (FIGS. 2-4 and/or 6) flowing through the turbine section 126 and/or the exhaust section 128. In some examples, the heat exchange fluid flowing through the first bypass conduit 409 receives a reduced amount of thermal energy from the combustion gases 160.

At block 914, the second conduit(s) 404 cause the heat exchange fluid to receive thermal energy from the aft portion of the gas turbine 100. For example, the second conduit(s) 404 can carry the heat exchange fluid at least partially around and/or through the turbine section 126 and/or the exhaust section 128. As a result, the second conduit(s) 404 can cause the heat exchange fluid to receive thermal energy from the combustion gases 160.

At block 916, the controlling circuitry 316 determines whether to cause the heat exchange fluid to at least partially bypass the vaporizer 405 (FIGS. 4 and/or 6). For example, the valve controlling circuitry 730 can compare the temperature of the hydrogen in the first conduit(s) 402 to a second temperature threshold and/or compare the pressure of the hydrogen to a second pressure threshold. In response to the temperature of the hydrogen satisfying (e.g., being greater than) the second temperature threshold and/or the pressure of the hydrogen satisfying (e.g., being greater than) the second pressure threshold, the operations proceed to block 918. Otherwise, in response to the temperature of the hydrogen not satisfying the second temperature threshold and/or pressure of the hydrogen not satisfying the second pressure threshold, the operations proceed to block 920.

At block 918, the controlling circuitry 316 adjusts a position of the second bypass valve 410 (FIGS. 4 and/or 6). For example, the valve controlling circuitry 730 can cause the second bypass valve 410 to at least partially open in response to the temperature of the hydrogen satisfying the second temperature threshold and/or the pressure of the hydrogen satisfying the second pressure threshold. As a result, at least partially opening the second bypass valve 410 can cause at least a portion of the heat exchange fluid to flow through the second bypass conduit 411 and bypass the vaporizer 405. Accordingly, the heat exchange fluid in the second bypass conduit 411 may not transfer heat to the hydrogen. In some examples, the second bypass conduit 411 is in connection with another heat exchanger that enables a temperature of the heat exchange fluid to be reduced.

At block 920, the vaporizer 405 causes the hydrogen to receive thermal energy from the heat exchange fluid. For example, the vaporizer 405 can be implemented as a shell and tube heat exchanger, a double pipe heat exchanger, or any other type of heat exchanger that enables heat to be passed from the heat exchange fluid to the hydrogen. In turn, the heat can cause the hydrogen to transition from a liquid state to a gaseous state or a super-critical phase.

At block 922, the nozzle(s) 304 (FIGS. 3-4 and/or 6) inject the hydrogen into the combustor section 124. As a result, the hydrogen can mix with the air 152 in the combustor section 124 where the air 152 and the hydrogen partake in a combustion reaction to produce mechanical energy that drives the rotor blades 144 of the turbine section 126 and, in turn, drives a rotation of the LP shaft 146 (FIG. 2) and the HP shaft 148 (FIG. 2). Accordingly, the rotation of the LP shaft 146 and the HP shaft 148 can cause the fan 104 and the rotor blades 136 (FIG. 2) of the compressor section 122 to rotate and pull more of the air 152 through the gas turbine 100. Thus, the combustion can help propel the aircraft 10 (FIG. 1). Alternatively, when the gas turbine 100 is a generator, the rotation of the LP shaft 146 and/or the HP shaft 148 can cause electricity to be produced.

FIG. 10 is a flowchart representative of example machine readable instructions and/or example operations 1000 that may be partially executed and/or instantiated by processor circuitry to operate the third gas turbine system 600 of FIG. 6. The operations 1000 of FIG. 10 begin at block 1002, at which the fan 104 (FIGS. 2-4 and/or 6) causes the air 152 (FIGS. 2-4 and/or 6) to flow through the gas turbine 100 (FIGS. 2-4 and/or 6). For example, the fan 104 can rotate to drive the air 152 through the gas turbine 100.

At block 1004, the controlling circuitry 316 (FIGS. 3-7) causes the hydrogen pump 314 (FIGS. 3-4 and/or 6) to drive hydrogen through the first conduit(s) 402 (FIGS. 4 and/or 6). For example, the hydrogen pump controlling circuitry 710 (FIG. 7) can cause transmission of a drive signal to the hydrogen pump 314 to control an output flow rate of the hydrogen. In some examples, the hydrogen pump controlling circuitry 710 adjusts the drive signal to the hydrogen pump 314 based on a temperature, a pressure, and/or a flow rate of the hydrogen measured by the sensor(s) 317 (FIGS. 3-4 and/or 6).

At block 1006, the controlling circuitry 316 causes the heat exchange fluid pump 406 (FIGS. 4 and/or 6) to drive the heat exchange fluid through the second conduit(s) 404 (FIGS. 4 and/or 6). For example, the heat exchange fluid pump controlling circuitry 720 (FIG. 7) can cause transmission of a drive signal to the heat exchange fluid pump 406 to control an output flow rate of the heat exchange fluid. In some examples, the heat exchange fluid pump controlling circuitry 720 adjusts the drive signal to the heat exchange fluid pump 406 based on the temperature, the pressure, and/or the flow rate of the hydrogen in the first conduit(s) 402.

At block 1008, the controlling circuitry 316 determines whether to cause the heat exchange to at least partially bypass the ECS heat exchanger 602 (FIG. 6). For example, the valve controlling circuitry 730 (FIG. 7) can compare a temperature and/or a pressure of the air 152 passing through the ECS heat exchanger 602 and/or associated with an environmental control system to a first temperature threshold and/or a first pressure threshold. In response, the temperature of the air 152 satisfying (e.g., being less than) than the first temperature threshold and/or the pressure of the air 152 satisfying (e.g., being less than) the first pressure threshold, the operations proceed to block 1010. Otherwise, in response to the temperature of the air 152 not satisfying (e.g., being greater than) the first temperature threshold and/or the pressure of the air 152 not satisfying (e.g., being greater than) the first pressure threshold, the operations proceed to block 1012.

At block 1010, the controlling circuitry 316 adjusts a position of the third bypass valve 608 (FIG. 6). For example, the valve controlling circuitry 730 (FIG. 7) can cause the third bypass valve 608 to at least partially open to enable the heat exchange fluid to enter the third bypass conduit 614. As such, at least a portion of the heat exchange fluid can bypass the ECS heat exchanger 602, which can cause the air 152 in the ECS heat exchanger 602 to dump a reduced amount of heat into the heat exchange fluid as the heat exchange fluid may remain in the ECS heat exchanger 602 for an increased period, which can cause the heat exchange fluid to reach an increased temperature or a plateau temperature at a faster rate.

At block 1012, the ECS heat exchanger 602 causes the heat exchange fluid to receive thermal energy from a portion of the air 152 that bleeds from the compressor section 122. For example, the ECS heat exchanger 602 can be in connection with a conduit that receives a portion the air 152 that bleeds from the compressor section 122 and delivers the air 152 to the aircraft 10 (FIG. 1) where it can be utilized to provide pressurization to the fuselage 12. Accordingly, the ECS heat exchanger 602 can receive the heat exchange fluid and the air 152 to be supplied to the aircraft 10 and, in turn, cause the heat exchange fluid to cool and compress the air 152 while the air 152 warms the heat exchange fluid.

At block 1014, the controlling circuitry 316 determines whether to cause the heat exchange fluid to bypass the CCA heat exchanger 604 (FIG. 6). For example, the valve controlling circuitry 730 can determine whether a temperature of the heat exchange fluid in the intercooler 320 satisfies (e.g., is less than) a second temperature threshold. Further, in response to the temperature of the heat exchange fluid in the intercooler 320 no satisfying (e.g., being greater than) the second temperature threshold, the operations proceed to block 1016. Otherwise, the operations proceed to block 1018.

At block 1016, the controlling circuitry 316 adjusts a position of the fourth bypass valve 610. For example, the valve controlling circuitry 730 can cause the fourth bypass to at least partially open to enable at least a portion of the heat exchange fluid to flow through the fourth bypass conduit 616 instead of the CCA heat exchanger 604. In turn, by bypassing the CCA heat exchanger 604, the heat exchange fluid can remain at a reduced temperature and, thus, the second conduit(s) 404 can supply cooler heat exchange fluid to the intercooler 320.

At block 1018, the CCA heat exchanger 604 causes the heat exchange fluid to receive thermal energy from a portion of the air 152 that bleeds from the compressor section 122. For example, the CCA heat exchanger 604 can be in connection with a conduit that receives a portion of the air 152 that bleeds from the compressor section 122 and returns the air 152 to an aft stage of the compressor section 122. Accordingly, the CCA heat exchanger 604 can cause the heat exchange fluid to cool and compress the air 152 while the air 152 warms the heat exchange fluid.

At block 1020, the intercooler 320 causes the heat exchange fluid to receive thermal energy from the air 152 flowing through a forward portion of the gas turbine 100 (e.g., a portion of the gas turbine 100 forward of the combustor section 124 (FIGS. 2-4 and/or 6)). For example, the intercooler 320 can be positioned between stages of the compressor section 122 (FIGS. 2-4 and/or 6) of the gas turbine 100 (e.g., between the LP compressor 130 (FIG. 2) and the HP compressor 132 (FIG. 2), between a stage of the rotor blades 136 (FIG. 2) and a stage of the stator vanes 134 (FIG. 2), etc.). Further, the intercooler 320 can receive the heat exchange fluid via the second conduit(s) 404 or the second conduit(s) 404 can pass through the intercooler 320. In turn, the intercooler 320 enables the heat exchange fluid to extract heat from the air 152 flowing through the intercooler 320. In turn, the intercooler 320 enables the heat exchange fluid to cool the air 152 while the air 152 warms the heat exchange fluid.

At block 1022, the controlling circuitry 316 determines whether to cause the heat exchange fluid to bypass the oil cooling heat exchanger 606 (FIG. 6). For example, the valve controlling circuitry 730 can compare the temperature of the heat exchange fluid in the intercooler 320 to a third temperature threshold. Additionally or alternatively, the valve controlling circuitry 730 can compare a temperature of the oil passing through the oil cooling heat exchanger 606 to a fourth temperature threshold. In response to the temperature of the heat exchange fluid in the intercooler 320 satisfying (e.g., being less than) the third temperature threshold and/or the temperature of the oil satisfying (e.g., being less than) the fourth temperature threshold, the operations proceed to block 1024. Otherwise, the operations proceed to block 1026.

At block 1024, the controlling circuitry 316 adjusts a position of the fifth bypass valve 612 (FIG. 6). For example, the valve controlling circuitry 730 can cause the fifth bypass valve 612 to at least partially open in response to the temperature of the heat exchange fluid in the intercooler 320 satisfying the third temperature threshold and/or the temperature of the oil satisfying the fourth temperature threshold. As a result, at least a portion of the heat exchange fluid can enter the fifth bypass conduit 618 (FIG. 6) and, thus, avoid the oil cooling heat exchanger 606. In turn, the oil cooling heat exchanger can enable the oil therein to dump a reduced amount of thermal energy into the heat exchange fluid such that the oil can remain above a temperature that may otherwise cause the oil to congeal.

At block 1026, the oil cooling heat exchanger 606 causes the heat exchange fluid to receive thermal energy from the oil. For example, the oil cooling heat exchanger 606 can be in connection with an oil supply and/or one or more actuation system that utilizes oil as a lubricant, such as the heat exchange fluid pump 406 (FIGS. 4-6) and/or the hydrogen pump 314 (FIGS. 3-6). In turn, the oil cooling heat exchanger 606 can cause the oil to warm the heat exchange fluid while the heat exchange fluid cools the oil.

At block 1028, the controlling circuitry 316 determines whether to cause the heat exchange fluid to at least partially bypass an aft portion of the gas turbine 100 (e.g., a portion of the gas turbine 100 aft of the combustor section 124). For example, the valve controlling circuitry 730 can compare a temperature of the hydrogen in the first conduit(s) 402 to a fifth temperature threshold and/or compare a pressure of the hydrogen in the first conduit(s) 402 to a third pressure threshold. In response to the temperature of the hydrogen satisfying (e.g., being greater than) the fifth temperature threshold and/or the pressure of the hydrogen satisfying (e.g., being greater than) the third pressure threshold, the operations proceed to block 1030. Otherwise, in response to the temperature of the hydrogen not satisfying the fifth temperature threshold and/or the pressure of the hydrogen in the first conduit(s) 402 not satisfying the third pressure threshold, the operations proceed to block 1032.

At block 1030, the controlling circuitry 316 adjusts a position of the first bypass valve 408 (FIGS. 4 and/or 6). For example, the valve controlling circuitry 730 can cause the first bypass valve 408 to at least partially open to enable the heat exchange fluid to enter the first bypass conduit 409 (FIGS. 4 and/or 6). In some examples, the heat exchange fluid flowing through the first bypass conduit 409 does not receive thermal energy from the combustion gases 160 (FIGS. 2-4 and/or 6) flowing through the turbine section 126 and/or the exhaust section 128. In some examples, the heat exchange fluid flowing through the first bypass conduit 409 receives a reduced amount of thermal energy from the combustion gases 160.

At block 1032, the second conduit(s) 404 cause the heat exchange fluid to receive thermal energy from the aft portion of the gas turbine 100. For example, the second conduit(s) 404 can carry the heat exchange fluid at least partially around and/or through the turbine section 126 and/or the exhaust section 128. As a result, the second conduit(s) 404 can cause the heat exchange fluid to receive thermal energy from the combustion gases 160.

At block 1034, the controlling circuitry 316 determines whether to cause the heat exchange fluid to at least partially bypass the vaporizer 405 (FIGS. 4 and/or 6). For example, the valve controlling circuitry 730 can compare the temperature of the hydrogen in the first conduit(s) 402 to a sixth temperature threshold and/or compare the pressure of the hydrogen to a fourth pressure threshold. In response to the temperature of the hydrogen satisfying (e.g., being greater than) the sixth temperature threshold and/or the pressure of the hydrogen satisfying (e.g., being greater than) the fourth pressure threshold, the operations proceed to block 1036. Otherwise, in response to the temperature of the hydrogen not satisfying the sixth temperature threshold and/or pressure of the hydrogen not satisfying the fourth pressure threshold, the operations proceed to block 1038.

At block 1036, the controlling circuitry 316 adjusts a position of the second bypass valve 410 (FIGS. 4 and/or 6). For example, the valve controlling circuitry 730 can cause the second bypass valve 410 to at least partially open in response to the temperature of the hydrogen satisfying the sixth temperature threshold and/or the pressure of the hydrogen satisfying the fourth pressure threshold. As a result, at least partially opening the second bypass valve 410 can cause at least a portion of the heat exchange fluid to flow through the second bypass conduit 411 and bypass the vaporizer 405. Accordingly, the heat exchange fluid in the second bypass conduit 411 may not transfer heat to the hydrogen. In some examples, the second bypass conduit 411 is in connection with another heat exchanger that enables a temperature of the heat exchange fluid to be reduced.

At block 1038, the vaporizer 405 causes the hydrogen to receive thermal energy from the heat exchange fluid. For example, the vaporizer 405 can be implemented as a shell and tube heat exchanger, a double pipe heat exchanger, or any other type of heat exchanger that enables heat to be passed from the heat exchange fluid to the hydrogen. In turn, the heat can cause the hydrogen to transition from a liquid state to a gaseous state or a super-critical phase.

At block 1040, the nozzle(s) 304 (FIGS. 3-4 and/or 6) inject the hydrogen into the combustor section 124. As a result, the hydrogen can mix with the air 152 in the combustor section 124 where the air 152 and the hydrogen can partake in a combustion reaction to produce mechanical energy that drives the rotor blades 144 of the turbine section 126 and, in turn, drives a rotation of the LP shaft 146 (FIG. 2) and the HP shaft 148 (FIG. 2). Accordingly, the rotation of the LP shaft 146 and the HP shaft 148 can cause the fan 104 and the rotor blades 136 (FIG. 2) of the compressor section 122 to rotate and pull more of the air 152 through the gas turbine 100. Thus, the combustion can help propel the aircraft 10 (FIG. 1). Alternatively, when the gas turbine 100 is a generator, the rotation of the LP shaft 146 and/or the HP shaft 148 can cause electricity to be produced.

Figure 11:
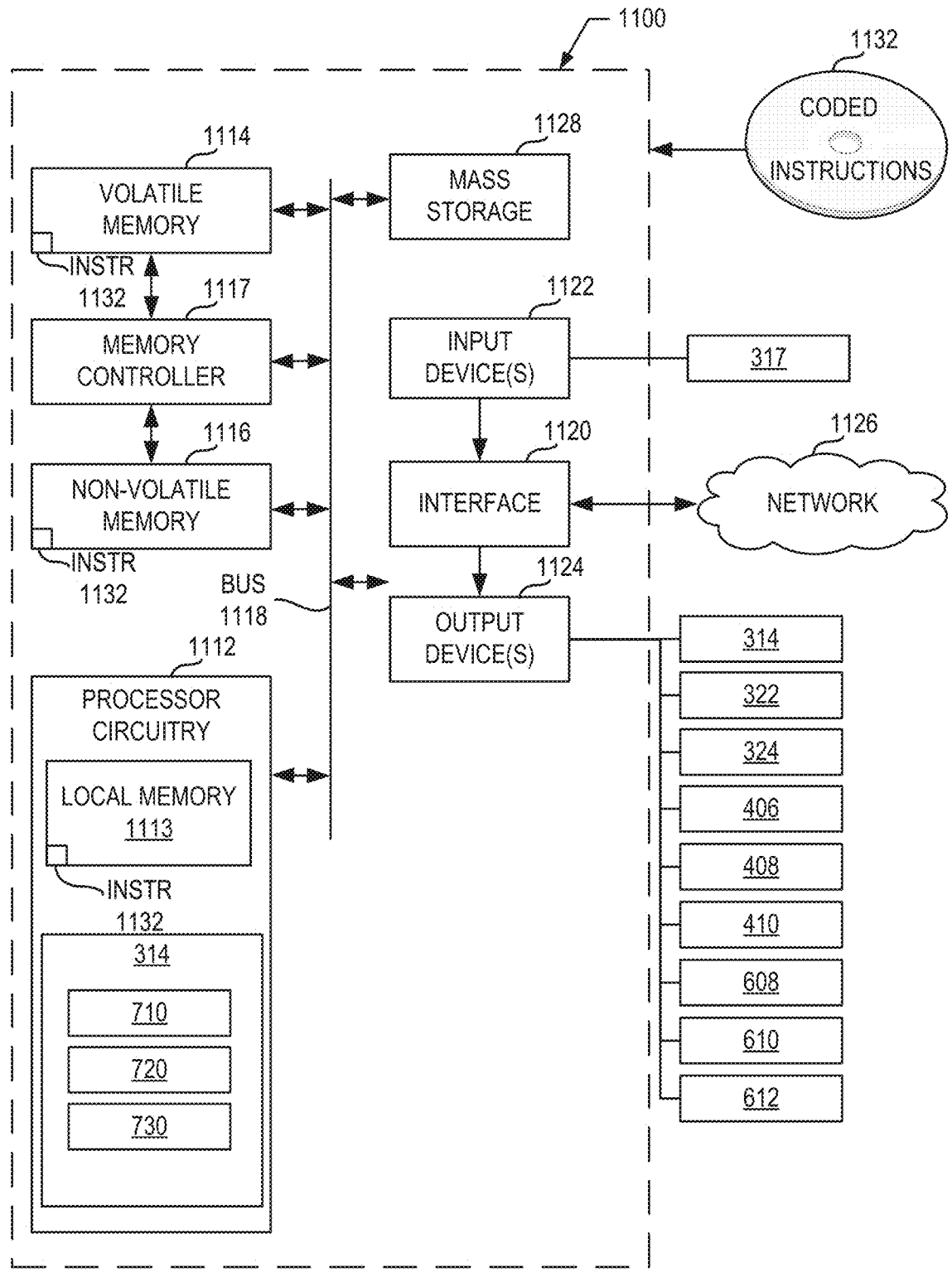
FIG. 11 is a block diagram of an example processing platform including processor circuitry structured to execute the example machine readable instructions and/or the example operations of FIGS. 8-10 to implement the controlling circuitry of FIG. 7.

FIG. 11 is a block diagram of an example processor platform 1100 structured to execute and/or instantiate the machine readable instructions and/or the operations of FIGS. 8-10 to implement the first gas turbine system 300 of FIG. 3, the second gas turbine system 400 of FIG. 4, and/or the third gas turbine system 600 of FIG. 6. The processor platform 1100 can be, for example, a server, a workstation, a self-learning machine (e.g., a neural network), or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the controlling circuitry 316 including the hydrogen pump controlling circuitry 710, the heat exchange fluid pump controlling circuitry 720, and the valve controlling circuitry 730.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, one or more temperature sensors, one or more pressure sensors, and/or one or more flow rate sensors. In this example, the input device(s) 1122 is in connection with the sensor(s) 317 of FIGS. 3, 4, and/or 6.

One or more output devices 1124 are also connected to the interface circuitry 1120 of the illustrated example. The output device(s) 1124 can be implemented, for example, by one or more actuators. In this example, the output device(s) 1124 is in connection with the hydrogen pump 314 of FIGS. 3, 4, and/or 6, the fuel metering valve(s) 322 of FIGS. 3, 4, and/or 6, the safety valve 324 of FIGS. 3, 4, and/or 6, the heat exchange fluid pump 406 of FIGS. 4-6, the first bypass valve 408 of FIGS. 4 and/or 6, the second bypass valve 410 of FIGS. 4 and/or 6, the third bypass valve 608 of FIG. 6, the fourth bypass valve 610 of FIG. 6, and/or the fifth bypass valve 612 of FIG. 6. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1132, which may be implemented by the machine readable instructions of FIGS. 8-10, may be stored in the mass storage device 1128, in the volatile memory 1114, in the non-volatile memory 1116, and/or on a removable non-transitory computer readable storage medium such as a CD or DVD.

From the foregoing, it will be appreciated that example systems, methods, apparatus, and articles of manufacture have been disclosed that operate gas turbines with hydrogen as the combusting fuel. The example gas turbine systems disclosed herein efficiently convert liquid or cryogenic hydrogen into a gaseous or super-critical, combustible form. Additionally, the example gas turbine systems disclosed herein extract heat from other working fluids, such as air flowing through the compressor, which increases a density of the air. In turn, the air can be compressed more efficiently, which increases the overall pressure ratio of the gas turbine while enabling the work input of the compressor to be reduced. For example, the compressor can include a reduced size, fewer stages, and/or a reduced blade speed. Moreover, the gas turbine systems disclosed herein control the amount of heat that the hydrogen receives such that liquid or cryogenic hydrogen can be heated to a combustible temperature range without causing spontaneous ignition. Similarly, the gas turbine systems disclosed herein control the amount of heat that other working fluids receive to maintain such working fluids within certain temperature and/or pressure ranges.

The foregoing examples of the gas turbine systems can be used to produce power and/or mechanical drive for aeronautics, marine applications, gear boxes, off-shore power generators, terrestrial power plants, etc. Although each example gas turbine system disclosed above has certain features, it should be understood that it is not necessary for a particular feature of one example gas turbine to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Example methods, apparatus, systems, and articles of manufacture to operate gas turbines with hydrogen as a combusting fuel are disclosed herein. Further examples and combinations thereof include the following:

Example 1 includes a gas turbine system comprising an intercooler disposed between a fan and at least a portion of a compressor, and at least one conduit to define a flow path to convey fluid, the flow path including a first portion and a second portion, the first portion of the flow path to carry the fluid to or through the intercooler, the second portion of the flow path to carry the fluid at least partially around at least one of a low-pressure turbine downstream of the compressor or an exhaust section downstream of the low-pressure turbine.

Example 2 includes the gas turbine system of any preceding clause, wherein the fluid is hydrogen, wherein the at least one conduit defines a third portion of the flow path downstream of the first portion and the second portion, further including at least one combustor nozzle, the third portion of the flow path to carry the hydrogen to the at least one combustor nozzle.

Example 3 includes the gas turbine system of any preceding clause, wherein the at least one conduit defines the second portion of the flow path downstream of the first portion.

Example 4 includes the gas turbine system of any preceding clause, wherein the fluid is a heat exchange fluid, the at least one conduit is at least one first conduit, and the flow path is a first flow path, further including a heat exchange fluid pump in connection with the at least one first conduit, the heat exchange fluid pump to drive the heat exchange fluid through the first flow path, at least one combustor nozzle to inject hydrogen into a combustor, at least one second conduit to define a second flow path to convey the hydrogen to the at least one combustor nozzle, and a vaporizer in connection with the at least one first conduit and the at least one second conduit, the vaporizer to cause thermal energy to be transferred between the heat exchange fluid and the hydrogen.

Example 5 includes the gas turbine system of any preceding clause, further including memory, instructions in the gas turbine system, and processor circuitry to control a drive signal to the heat exchange fluid pump based on at least one of a temperature of the heat exchange fluid or a temperature of the hydrogen, wherein the drive signal controls a flow rate of the heat exchange fluid.

Example 6 includes the gas turbine system of any preceding clause, further including a bypass valve in connection with the at least one first conduit, the bypass valve to cause the heat exchange fluid to bypass the vaporizer in response to a pressure of the hydrogen in the second flow path satisfying a pressure threshold.

Example 7 includes the gas turbine system of any preceding clause, wherein the bypass valve is a first bypass valve, further including a second bypass valve in connection with the at least one first conduit, the second bypass valve to cause the heat exchange fluid to bypass the second portion of the flow path in response to at least one of the temperature of the heat exchange fluid satisfying a first temperature threshold or the temperature of the hydrogen satisfying a second temperature threshold.

Example 8 includes the gas turbine system of any preceding clause, further including a heat exchanger in connection with the at least one first conduit and the compressor, the heat exchanger to receive bleed air from the compressor, the heat exchanger to cause the bleed air to transfer thermal energy to the heat exchange fluid.

Example 9 includes the gas turbine system of any preceding clause, wherein the heat exchanger is a first heat exchanger, further including at least one of a second heat exchanger in connection with the at least one first conduit and an environmental control system that provides air to a fuselage, or a third heat exchanger in connection with the at least one first conduit and a lubrication system that provides a lubricant to an actuator.

Example 10 includes the gas turbine system of any preceding clause, wherein the heat exchange fluid is supercritical carbon dioxide.

Example 11 includes the gas turbine system of any preceding clause, wherein the first flow path is a closed loop.

Example 12 includes the gas turbine system of any preceding clause, wherein the second flow path includes a first portion and a second portion, the first portion of the second flow path defined upstream of the vaporizer, the second portion of the second flow path defined downstream of the vaporizer, wherein the hydrogen is in a liquid state in the first portion of the second flow path, wherein the hydrogen is in a gaseous state or a supercritical phase in the second portion of the second flow path.

Example 13 includes a method to operate a gas turbine with hydrogen, the method comprising causing a first fluid to flow axially through the gas turbine, causing a second fluid to receive first thermal energy from the first fluid as the first fluid flows through a first portion of the gas turbine, the first portion of the gas turbine upstream of at least a portion of a compressor of the gas turbine, and causing the second fluid to receive second thermal energy from the first fluid as the first fluid flows through a second portion of the gas turbine, the second portion of the gas turbine downstream of a combustor of the gas turbine.

Example 14 includes the method of any preceding clause, further including causing a third fluid to receive third thermal energy from the second fluid, and injecting the third fluid into the combustor, wherein injecting the third fluid into the combustor mixes the third fluid and the first fluid.

Example 15 includes the method of any preceding clause, further including causing the second fluid to receive fourth thermal energy from a fourth fluid, wherein the fourth fluid is to be provided to a fuselage, and causing the second fluid to receive fifth thermal energy from a fifth fluid, wherein the fifth fluid is a lubricant associated with an actuation system.

Example 16 includes the method of any preceding clause, further including causing a portion of the first fluid to exit an axial flow path of the gas turbine, causing the second fluid to receive fourth thermal energy from the portion of the first fluid, and inducing the portion of the first fluid back into the axial flow path of the gas turbine.

Example 17 includes an apparatus to operate a gas turbine with hydrogen, the apparatus comprising means for compressing a first fluid, first means for exchanging thermal energy to transfer heat between the first fluid and a second fluid, the first means for exchanging thermal energy positioned forward of at least a portion of the means for compressing, means for combusting positioned aft of the means for compressing, and second means for exchanging thermal energy to transfer heat between the first fluid and the second fluid, the second means for exchanging thermal energy positioned aft of the means for combusting.

Example 18 includes the apparatus of any preceding clause, further including third means for exchanging thermal energy to transfer heat between the second fluid and a third fluid, wherein the means for combusting is to utilize the first fluid and the third fluid.

Example 19 includes the apparatus of any preceding clause, further including means for pumping the second fluid, and means for controlling the means for pumping the second fluid, wherein the means for controlling is to reduce an output flow rate of the means for pumping in response to a temperature of a portion of the third fluid satisfying a temperature threshold.

Example 20 includes the apparatus of any preceding clause, further including means for causing the second fluid to bypass the third means for exchanging thermal energy in response to a pressure of the third fluid satisfying a pressure threshold or in response to a temperature of the third fluid satisfying a temperature threshold.

Example 21 includes an apparatus to operate a gas turbine engine with hydrogen, the apparatus comprising a fan, a compressor, an inter-cooler disposed between the fan and the compressor, a combustor, at least one nozzle fluidly coupled to the combustor, a conduit to carry fluid, the conduit including a first portion, a second portion, and a third portion, the second portion positioned between the first portion and the third portion, the first portion of the conduit to carry the fluid through the intercooler, the second portion of the conduit to carry the fluid at least one of through or around an aft portion of the gas turbine engine, the third portion of the fuel line to carry the hydrogen to the at least one nozzle, and a hydrogen pump to drive hydrogen through the fluid line.

Example 22 includes a method to operate a gas turbine with hydrogen, the method comprising causing a first fluid to flow through an intercooler disposed upstream of at least a portion of a compressor of the gas turbine, wherein the first fluid is to receive thermal energy from a second fluid as the first fluid flows through the intercooler, and causing the fluid to flow at least one of through or at least partially around an aft portion of the gas turbine, the aft portion of the gas turbine including at least one of a turbine section or an exhaust section, wherein the first fluid is to receive thermal energy from the second fluid as the first fluid flows at least one of through or at least partially around the aft portion of the gas turbine.

Example 23 includes at least one non-transitory computer-readable medium comprising instructions that, when executed, cause one or more processors to at least cause a first fluid to flow axially through the gas turbine, cause a second fluid to receive first thermal energy from the first fluid as the first fluid flows through a first portion of the gas turbine, the first portion of the gas turbine upstream of at least a portion of a compressor of the gas turbine, and cause the second fluid to receive second thermal energy from the first fluid as the first fluid flows through a second portion of the gas turbine, the second portion of the gas turbine downstream of a combustor of the gas turbine.

Example 24 includes the computer-readable medium of any preceding example, wherein the instructions, when executed, cause the one or more processors to cause a third fluid to receive third thermal energy from the second fluid, and cause the third fluid to be injected into the combustor, wherein injecting the third fluid into the combustor mixes the third fluid and the first fluid.

Example 25 includes the computer-readable medium of any preceding clause, wherein the instructions, when executed, cause the one or more processors to cause the second fluid to receive fourth thermal energy from a fourth fluid, wherein the fourth fluid is to be provided to a fuselage, and cause the second fluid to receive fifth thermal energy from a fifth fluid, wherein the fifth fluid is a lubricant associated with an actuation system.

Example 26 includes the computer-readable medium of any preceding clause, wherein the instructions, when executed, cause the one or more processors to control a drive signal to a pump that drives the second fluid based on at least one of a temperature of the second fluid or a temperature of the third fluid, wherein the drive signal controls a flow rate of the second fluid.

Example 27 includes the gas turbine system of any preceding example, wherein the intercooler is disposed between the fan and a stage of the compressor proximate the fan.

Example 28 includes the gas turbine system of any preceding example, wherein the intercooler is disposed between a first stage of the compressor and a second stage of the compressor downstream of the first stage.

Example 29 includes a gas turbine system comprising a hydrogen storage tank, an intercooler disposed between a fan and a compressor, one or more combustor nozzles, at least one conduit to define a flow path to convey hydrogen between the hydrogen storage tank and the one or more combustor nozzles, the flow path including a first portion and a second portion, the first portion of the flow path to carry the hydrogen to or through the intercooler, the second portion of the flow path to carry the hydrogen at least partially around a low-pressure turbine downstream of a combustor and an exhaust section downstream of the low-pressure turbine, a pump to drive the hydrogen through the at least one conduit, one or more sensors to measure at least one of a temperature, a pressure, or a flow rate of the hydrogen in the at least one conduit, one or more metering valves operatively coupled to the at least one conduit, and controlling circuitry operatively coupled to the pump, the one or more sensors, and the one or more metering valves.

Example 30 includes a gas turbine system comprising a hydrogen storage tank, an intercooler disposed between a fan and a compressor, one or more combustor nozzles, at least one first conduit to define a first flow path to convey hydrogen between the hydrogen storage tank and the one or more combustor nozzles, at least one second conduit to define a second flow path to convey a heat exchange fluid, the second flow path including a first portion and a second portion, the first portion of the second flow path to carry the heat exchange fluid to or through the intercooler, the second portion of the second flow path to carry the heat exchange fluid at least partially around a low-pressure turbine downstream of a combustor and an exhaust section downstream of the low-pressure turbine, a vaporizer including or in connection with the at least one first conduit and the at least one second conduit, the heat exchange fluid to transfer thermal energy to the hydrogen in the vaporizer, a first pump to drive the hydrogen through the at least one first conduit, a second pump to drive the heat exchange fluid through the at least one second conduit, one or more sensors to measure at least one of a temperature, a pressure, or a flow rate of the hydrogen in the at least one conduit, one or more metering valves operatively coupled to at least one of the at least one first conduit or the at least one second conduit, a first bypass valve in connection with the at least one second conduit between the second portion of the second flow path and the vaporizer, the first bypass valve to enable the heat exchange fluid to bypass the vaporizer, a second bypass valve in connection with the at least one second conduit between the first portion of the second flow path and the second portion of the second flow path, the second bypass valve to enable the heat exchange fluid to bypass the second portion of the second flow path, and controlling circuitry operatively coupled to the first pump, the second the one or more sensors, the first bypass valve, the second bypass valve, and the one or more metering valves.

Example 31 includes a gas turbine system comprising a hydrogen storage tank, an intercooler disposed between a fan and a compressor, one or more combustor nozzles, at least one first conduit to define a first flow path to convey hydrogen between the hydrogen storage tank and the one or more combustor nozzles, at least one second conduit to define a second flow path to convey a heat exchange fluid, the second flow path including a first portion and a second portion, the first portion of the second flow path to carry the heat exchange fluid to or through the intercooler, the second portion of the second flow path to carry the heat exchange fluid at least partially around a low-pressure turbine downstream of a combustor and an exhaust section downstream of the low-pressure turbine, a vaporizer including or in connection with the at least one first conduit and the at least one second conduit, the heat exchange fluid to transfer thermal energy to the hydrogen in the vaporizer, a first pump to drive the hydrogen through the at least one first conduit, a second pump to drive the heat exchange fluid through the at least one second conduit, one or more sensors to measure at least one of a temperature, a pressure, or a flow rate of the hydrogen in the at least one conduit, one or more metering valves operatively coupled to at least one of the at least one first conduit or the at least one second conduit, a first bypass valve in connection with the at least one second conduit between the second portion of the second flow path and the vaporizer, the first bypass valve to enable the heat exchange fluid to bypass the vaporizer, a second bypass valve in connection with the at least one second conduit between the first portion of the second flow path and the second portion of the second flow path, the second bypass valve to enable the heat exchange fluid to bypass the second portion of the second flow path, an environmental control system heat exchanger in connection with the second conduit between the vaporizer and the intercooler, a cooled cooling air heat exchanger in connection with the second conduit between the environmental control system heat exchanger and the intercooler, and an oil cooler heat exchanger in connection with the second conduit between the first portion of the second flow path and the second portion of the second flow path, a third bypass valve operatively coupled to the at least one second conduit between the vaporizer and the environmental control system heat exchanger, a fourth bypass valve operatively coupled to the at least one second conduit between the environmental control system heat exchanger and the cooled cooling air heat exchanger, and a fifth bypass valve operatively coupled to the at least one second conduit between the intercooler and the oil cooler heat exchanger, and controlling circuitry operatively coupled to the first pump, the second the one or more sensors, the first bypass valve, the second bypass valve, the third bypass valve, the fourth bypass valve, the fifth bypass valve, and the one or more metering valves.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A gas turbine system comprising:
an intercooler disposed between a fan and at least a portion of a compressor;
at least one first conduit to define a first flow path to convey a heat exchange fluid, the at least one first conduit including a first portion and a second portion, the first portion of the at least one first conduit in connection with the intercooler and positioned at least partially around at least one of i) a low-pressure turbine or ii) an exhaust section downstream of a combustor, the first portion of the at least one first conduit to carry the heat exchange fluid from the intercooler to at least partially around the at least one of i) the low-pressure turbine or ii) the exhaust section, the second portion of the at least one first conduit in connection with the intercooler and positioned at least partially around the at least one of i) the low-pressure turbine or ii) the exhaust section, the second portion of the at least one first conduit to carry the heat exchange fluid from the at least one of i) the low-pressure turbine or ii) the exhaust section to the intercooler, the first portion of the at least one first conduit defining a first section of the first flow path, the second portion of the at least one first conduit defining a second section of the first flow path that does not overlap with the first section of the first flow path;
at least one combustor nozzle to inject hydrogen into the combustor; and
at least one second conduit to define a second flow path to convey the hydrogen to the at least one combustor nozzle, the second flow path fluidly separate from the first flow path.

2. The gas turbine system of claim 1, further including:
a heat exchange fluid pump in connection with the at least one first conduit, the heat exchange fluid pump to drive the heat exchange fluid through the first flow path; and
a vaporizer in connection with the at least one first conduit and the at least one second conduit, the vaporizer to cause thermal energy to be transferred between the heat exchange fluid and the hydrogen.

3. The gas turbine system of claim 2, further including:
memory;
instructions in the gas turbine system; and
processor circuitry to control a drive signal to the heat exchange fluid pump based on at least one of a temperature of the heat exchange fluid or a temperature of the hydrogen, wherein the drive signal controls a flow rate of the heat exchange fluid.

4. The gas turbine system of claim 2, further including a bypass valve in connection with the at least one first conduit, the bypass valve to cause the heat exchange fluid to bypass the vaporizer in response to a pressure of the hydrogen in the second flow path satisfying a pressure threshold.

5. The gas turbine system of claim 4, wherein the bypass valve is a first bypass valve, further including a second bypass valve in connection with the at least one first conduit, the second bypass valve to cause the heat exchange fluid to bypass a portion of at least one of the first section or the second section of the first flow path that is positioned at least partially around at least one of i) the low-pressure turbine or ii) the exhaust section in response to at least one of a temperature of the heat exchange fluid satisfying a first temperature threshold or a temperature of the hydrogen satisfying a second temperature threshold.

6. The gas turbine system of claim 2, further including a heat exchanger in connection with the at least one first conduit and the compressor, the heat exchanger to receive bleed air from the compressor, the heat exchanger to cause the bleed air to transfer thermal energy to the heat exchange fluid.

7. The gas turbine system of claim 6, wherein the heat exchanger is a first heat exchanger, further including at least one of:
a second heat exchanger in connection with the at least one first conduit and an environmental control system that provides air to a fuselage; or
a third heat exchanger in connection with the at least one first conduit and a lubrication system that provides a lubricant to an actuator.

8. The gas turbine system of claim 2, wherein the heat exchange fluid is supercritical carbon dioxide.

9. The gas turbine system of claim 2, wherein the first flow path is a closed loop.

10. The gas turbine system of claim 2, wherein the second flow path includes a first portion and a second portion, the first portion of the second flow path defined upstream of the vaporizer, the second portion of the second flow path defined downstream of the vaporizer, wherein the hydrogen is in a liquid state in the first portion of the second flow path, wherein the hydrogen is in a gaseous state or a supercritical phase in the second portion of the second flow path.

11. A method to operate a gas turbine with hydrogen, the method comprising:
causing a first fluid to flow axially through the gas turbine;
causing a second fluid to receive first thermal energy from the first fluid as the first fluid flows through a first portion of the gas turbine and the second fluid flows through a first portion of at least one conduit, the first portion of the gas turbine upstream of at least a portion of a compressor of the gas turbine;
causing the second fluid to receive second thermal energy from the first fluid as the first fluid flows through a second portion of the gas turbine and the second fluid flows through a second portion of the at least one conduit downstream of the first portion of the at least one conduit, the second portion of the gas turbine downstream of a combustor of the gas turbine;
causing the second fluid to transport from the second portion of the at least one conduit to the first portion of the at least one conduit through a third portion of the at least one conduit, the third portion of the at least one conduit uninvolved in transportation of the second fluid from the first portion to the second portion of the at least one conduit; and
causing a third fluid to receive third thermal energy from the second fluid and to inject the third fluid into the combustor.

12. The method of claim 11, further including,
wherein injecting the third fluid into the combustor mixes the third fluid and the first fluid.

13. The method of claim 12, further including:
causing the second fluid to receive fourth thermal energy from a fourth fluid, wherein the fourth fluid is to be provided to a fuselage; and
causing the second fluid to receive fifth thermal energy from a fifth fluid, wherein the fifth fluid is a lubricant associated with an actuation system.

14. The method of claim 12, further including:
causing a portion of the first fluid to exit an axial flow path of the gas turbine;
causing the second fluid to receive fourth thermal energy from the portion of the first fluid; and
inducing the portion of the first fluid back into the axial flow path of the gas turbine.

15. An apparatus to operate a gas turbine with hydrogen, the apparatus comprising:
means for compressing a first fluid;
first means for exchanging thermal energy to transfer heat between the first fluid and a second fluid, the first means for exchanging thermal energy positioned forward of at least a portion of the means for compressing;
means for combusting positioned aft of the means for compressing;
second means for exchanging thermal energy to transfer heat between the first fluid and the second fluid, the second means for exchanging thermal energy positioned aft of the means for combusting; and
means for conveying the second fluid including a first portion and a second portion that define a closed-loop flow path, the first portion of the means for conveying to convey the second fluid from the first means for exchanging thermal energy to the second means for exchanging thermal energy after the second fluid passes through the first means for exchanging thermal energy, the second portion of the means for conveying to convey the second fluid from the second means for exchanging thermal energy to the first means for exchanging thermal energy, the second portion of the means for conveying distinct from the first portion.

16. The apparatus of claim 15, further including third means for exchanging thermal energy to transfer heat between the second fluid and a third fluid, wherein the means for combusting is to utilize the first fluid and the third fluid.

17. The apparatus of claim 16, further including:
means for pumping the second fluid; and
means for controlling the means for pumping the second fluid, wherein the means for controlling is to reduce an output flow rate of the means for pumping in response to a temperature of a portion of the third fluid satisfying a temperature threshold.

18. The apparatus of claim 16, further including means for causing the second fluid to bypass the third means for exchanging thermal energy in response to a pressure of the third fluid satisfying a pressure threshold or in response to a temperature of the third fluid satisfying a temperature threshold.

* * * * *

UNITED STATES PATENT AND TRADEMARK OFFICE
CERTIFICATE OF CORRECTION

| | | |
|---|---|---|
| PATENT NO. | : 12,006,878 B2 | |
| APPLICATION NO. | : 17/736803 | |
| DATED | : June 11, 2024 | |
| INVENTOR(S) | : Brady | |

It is certified that error appears in the above-identified patent and that said Letters Patent is hereby corrected as shown below:

In the Claims

In Column 41, Claim 1, Line 36, delete "fluidly".
In Column 42, Claim 11, Line 56, delete "and to inject the third fluid into the combustor".
In Column 42, Claim 12, Line 58, delete "including," and insert --"including"--.
In Column 42, Claim 12, Line 59, insert --"injecting the third fluid into the combustor,"--.

Signed and Sealed this
Thirtieth Day of July, 2024

Katherine Kelly Vidal
*Director of the United States Patent and Trademark Office*